US009525228B2

United States Patent
Oda et al.

(10) Patent No.: US 9,525,228 B2
(45) Date of Patent: Dec. 20, 2016

(54) BATTERY TERMINAL, METHOD FOR MANUFACTURING BATTERY TERMINAL, AND BATTERY

(71) Applicants: NEOMAX MATERIALS CO., Ltd., Suita-shi, Osaka (JP); HITACHI METALS, LTD., Tokyo (JP)

(72) Inventors: Yoshimitsu Oda, Suita (JP); Masaharu Yamamoto, Osaka (JP); Masaaki Ishio, Osaka (JP)

(73) Assignee: HITACHI METALS, LTD., Tokyo (JP)

( * ) Notice: Subject to any disclaimer, the term of this patent is extended or adjusted under 35 U.S.C. 154(b) by 156 days.

(21) Appl. No.: 14/482,516

(22) Filed: Sep. 10, 2014

(65) Prior Publication Data

US 2015/0086867 A1  Mar. 26, 2015

(30) Foreign Application Priority Data

Sep. 25, 2013 (JP) ................................ 2013-198925
Jan. 17, 2014 (JP) ................................ 2014-006777

(51) Int. Cl.
*H01M 2/30* (2006.01)
*H01R 13/03* (2006.01)
*H01M 10/0525* (2010.01)
*H01M 2/20* (2006.01)
*H01R 43/16* (2006.01)

(52) U.S. Cl.
CPC ............. *H01R 13/03* (2013.01); *H01M 2/206* (2013.01); *H01M 2/305* (2013.01); *H01R 43/16* (2013.01); *H01M 10/0525* (2013.01); Y10T 29/49115 (2015.01)

(58) Field of Classification Search
CPC .. H01M 2/021; H01M 2/0212; H01M 2/0215; H01M 10/0525; H01M 2/206; H01M 2/30; H01M 2/305; H01M 2/307; H01R 13/03; H01R 43/16
See application file for complete search history.

(56) References Cited

U.S. PATENT DOCUMENTS

| 8,263,255 | B2 | 9/2012 | Byun et al. | |
|---|---|---|---|---|
| 2006/0032667 | A1* | 2/2006 | Sato | B23K 11/004 174/260 |
| 2012/0202090 | A1* | 8/2012 | Yamamoto | B23K 1/19 428/651 |
| 2013/0071686 | A1* | 3/2013 | Oda | B32B 15/017 428/652 |
| 2014/0178755 | A1 | 6/2014 | Oda et al. | |

FOREIGN PATENT DOCUMENTS

| JP | 2002-151045 A | 5/2002 | |
|---|---|---|---|
| JP | 2011-077039 A | 4/2011 | |
| JP | 5202772 B1 | 6/2013 | |
| WO | WO 2011155379 A1 * | 12/2011 | ........... B32B 15/017 |

* cited by examiner

*Primary Examiner* — Carlos Barcena
(74) *Attorney, Agent, or Firm* — Westerman, Hattori, Daniels & Adrian, LLP

(57) ABSTRACT

A battery terminal includes an overlay clad plate material including at least a first metal layer made of Al or Al alloy and a second metal layer made of Cu or Cu alloy, formed by bonding at least the first metal layer and the second metal layer to each other in the thickness direction. Either the first metal layer or the second metal layer of the clad plate material is partially removed to form an exposure surface on which either the second metal layer or the first metal layer is exposed in the clad plate material.

19 Claims, 15 Drawing Sheets

MODIFICATION OF FIRST EMBODIMENT

MODIFICATION OF THIRD EMBODIMENT

FOURTH EMBODIMENT

MODIFICATION OF FOURTH EMBODIMENT

FIFTH EMBODIMENT

SECOND MODIFICATION OF SIXTH EMBODIMENT

SECOND MODIFICATION OF SIXTH EMBODIMENT

BATTERY TERMINAL, METHOD FOR MANUFACTURING BATTERY TERMINAL, AND BATTERY

BACKGROUND OF THE INVENTION

Field of the Invention

The present invention relates to a battery terminal applicable to a lithium ion battery, for example, a method for manufacturing the battery terminal, and a battery including the battery terminal, and more particularly, it relates to a battery terminal including different metal layers, a method for manufacturing the battery terminal, and a battery including the battery terminal.

Description of the Background Art

A battery terminal including different metal layers is known in general, as disclosed in Japanese Patent No. 5202772, for example.

Japanese Patent No. 5202772 discloses a negative-electrode terminal made of a clad material in which an Al layer and a Ni—Cu alloy layer are bonded to each other. The clad material constituting this negative-electrode terminal is a so-called inlay clad material having the Ni—Cu alloy layer embedded in a groove formed in the Al layer. A region of the Al layer other than a region where the Ni—Cu alloy layer of the negative-electrode terminal is embedded is welded to a bus bar made of Al. The Ni—Cu alloy layer of the negative-electrode terminal is welded to a negative-electrode columnar portion made of Cu, exposed through a hole formed in the region where the Ni—Cu alloy layer is embedded. Consequently, the negative-electrode terminal is configured to be capable of easily electrically connecting the bus bar and the negative-electrode columnar portion made of different metal materials to each other.

However, the negative-electrode terminal disclosed in Japanese Patent No. 5202772 is made of the inlay clad material, and hence the Ni—Cu alloy layer must be precisely arranged at a proper position in order to be embedded in the groove of the Al layer. Therefore, the clad material itself is not easily prepared, and it is difficult to improve mass productivity at the time of mass production. Thus, it is desired to improve the mass productivity of the negative-electrode terminal.

SUMMARY OF THE INVENTION

The present invention has been proposed in order to solve the aforementioned problem, and an object of the present invention is to provide a battery terminal whose mass productivity can be improved, capable of easily electrically connecting members made of different metal materials to each other, a method for manufacturing the battery electrode, and a battery including the battery terminal.

A battery terminal according to a first aspect of the present invention includes an overlay clad plate material including at least a first metal layer made of Al or Al alloy and a second metal layer made of Cu or Cu alloy, formed by bonding at least the first metal layer and the second metal layer to each other in the thickness direction, and either the first metal layer or the second metal layer of the overlay clad plate material is partially removed to form an exposure surface on which either the second metal layer or the first metal layer is exposed.

As hereinabove described, the battery terminal according to the first aspect of the present invention is made of the overlay clad plate material formed by bonding at least the first metal layer and the second metal layer to each other in the thickness direction, whereby the clad plate material can be easily prepared simply by stacking the metal layers and bonding the same to each other without precisely controlling the positional relationship between the first metal layer and the second metal layer unlike the case where the battery terminal is made of an inlay clad material, and hence the battery terminal can be easily prepared. Consequently, the mass productivity of the battery terminal can be improved.

Furthermore, as hereinabove described, the battery terminal according to the first aspect of the present invention is made of the overlay clad plate material in which at least the first metal layer made of Al or Al alloy and the second metal layer made of Cu or Cu alloy are bonded to each other, whereby a member (a connecting member, a current collector, or the like) of a battery made of Al or Al alloy can be bonded to the first metal layer made of Al or Al alloy, and other members of the battery made of Cu or Cu alloy, Ni or Ni alloy, and Fe or Fe alloy can be bonded to the second metal layer made of Cu or Cu alloy. Thus, the members made of the different metal materials can be easily electrically connected to each other.

In the battery terminal according to the first aspect of the present invention, as hereinabove described, the exposure surface on which either the second metal layer or the first metal layer is exposed is formed on the overlay clad plate material. Thus, there is no interface between the first metal layer and the second metal layer on a portion of the overlay clad plate material formed with the exposure surface, and hence heat of bonding can be inhibited from reaching the interface between the first metal layer and the second metal layer distanced from the exposure surface when the member (the connecting member, the current collector, or the like) of the battery is bonded to the portion formed with the exposure surface. Consequently, formation of a fragile intermetallic compound (Al—Cu alloy) on the interface between the first metal layer and the second metal layer resulting from the heat can be suppressed, and hence a reduction in the bonding strength of the clad plate material can be suppressed.

In the aforementioned battery terminal according to the first aspect, either the first metal layer or the second metal layer preferably includes a first bonding surface bonded to a connecting member configured to connect a battery to an external portion, either the second metal layer or the first metal layer preferably includes a second bonding surface bonded to a current collector configured to connect with an electrode of the battery, the first bonding surface is preferably formed in a region excluding the exposure surface of a first surface on a side formed with the exposure surface, and the second bonding surface is preferably formed in a region corresponding to the exposure surface. According to this structure, the exposure surface on which either the second metal layer or the first metal layer is partially exposed can be reliably formed on the first surface on the side formed with the exposure surface. The "region corresponding to the exposure surface" denotes a region overlapping with the exposure surface in the thickness direction and a region around the region.

In the aforementioned structure in which the second bonding surface is formed in the region corresponding to the exposure surface, the second bonding surface is preferably formed on a second surface opposite to the exposure surface. According to this structure, there is no interface between the first metal layer and the second metal layer in a region corresponding to the second bonding surface, and hence the heat of bonding can be inhibited from reaching the interface in the region corresponding to the second bonding surface when the current collector is bonded to the second bonding surface. Thus, the formation of the fragile intermetallic compound (Al—Cu alloy) can be suppressed in the region corresponding to the second bonding surface.

In the aforementioned structure in which the second bonding surface is formed in the region corresponding to the exposure surface, a through-hole is preferably formed in the exposure surface, and the second bonding surface is preferably formed on an inner peripheral surface of the through-hole. According to this structure, the second bonding surface and the current collector inserted into the through-hole can be easily bonded to each other.

In the aforementioned structure in which the second bonding surface is formed in the region corresponding to the exposure surface, either the first metal layer or the second metal layer including the first bonding surface is preferably made of the same type of metal material as that of the connecting member, and either the second metal layer or the first metal layer including the second bonding surface is preferably made of the same type of metal material as that of the current collector. According to this structure, the same metal materials are bonded to each other, and hence either the first metal layer or the second metal layer and the connecting member can be easily bonded to each other while the contact resistance between either the first metal layer or the second metal layer and the connecting member is reduced, and either the second metal layer or the first metal layer and the current collector can be easily bonded to each other while the contact resistance between either the second metal layer or the first metal layer and the current collector is reduced.

In the aforementioned battery terminal according to the first aspect, the exposure surface is preferably formed in a concave shape concave toward a second surface opposite to the exposure surface beyond an interface between the first metal layer and the second metal layer. According to this structure, the exposure surface is not required to be precisely coplanar with the interface when either the second metal layer or the first metal layer is exposed. Thus, the exposure surface on which either the second metal layer or the first metal layer is exposed can be easily formed.

In the aforementioned battery terminal according to the first aspect, the clad plate material preferably includes a protrusion portion protruding toward a first surface on a side formed with the exposure surface, and the exposure surface is preferably formed on at least a part of the first surface toward which the protrusion portion protrudes. According to this structure, the member of the battery can be easily bonded to the protrusion portion, as compared with the case where the clad plate material is in the form of a flat plate. Thus, the battery can be easily manufactured from the battery terminal.

In this case, the length of the protrusion portion in the thickness direction is preferably larger than the length of a portion other than the protrusion portion in the thickness direction. According to this structure, the thickness of the protrusion portion formed with the exposure surface is large, whereby the heat of bonding can be effectively inhibited from reaching the interface between the first metal layer and the second metal layer distanced from the exposure surface when the member of the battery is bonded to the portion formed with the exposure surface. Thus, the formation of the fragile intermetallic compound (Al—Cu alloy) on the interface between the first metal layer and the second metal layer resulting from the heat can be effectively suppressed.

In the aforementioned battery terminal according to the first aspect, the clad plate material preferably further includes a reaction suppressing layer made of Ni or Ni alloy on an interface between the first metal layer and the second metal layer. According to this structure, even in the case where heat of bonding the first and second metal layers and the member of the battery to each other reaches the interface between the first metal layer and the second metal layer, the reaction suppressing layer made of Ni or Ni alloy can suppress reaction of the first metal layer with the second metal layer, and hence the formation of the fragile intermetallic compound (Al—Cu alloy) can be reliably suppressed.

In the aforementioned battery terminal according to the first aspect, the overlay clad plate material preferably further includes a third metal layer bonded to either the second metal layer or the first metal layer to hold either the second metal layer or the first metal layer between the third metal layer and either the first metal layer or the second metal layer, and the third metal layer in a region corresponding to the exposure surface is preferably partially removed to form a reverse side exposure surface on which either the second metal layer or the first metal layer is exposed. According to this structure, even in the case where either the first metal layer or the second metal layer and the third metal layer are arranged on both sides of either the second metal layer or the first metal layer to hold either the second metal layer or the first metal layer therebetween, the exposure surface and the reverse side exposure surface corresponding to the exposure surface are formed, whereby there is no interface between the first metal layer and the second metal layer or interface between either the second metal layer or the first metal layer and the third metal layer in a region where the exposure surface and the reverse side exposure surface corresponding to the exposure surface are formed. Thus, the heat of bonding can be inhibited from reaching the interface between the first metal layer and the second metal layer distanced from the exposure surface and the interface between either the second metal layer or the first metal layer and the third metal layer, and hence the reduction in the bonding strength of the clad plate material resulting from the heat can be suppressed.

Furthermore, the third metal layer bonded to either the second metal layer or the first metal layer to hold either the second metal layer or the first metal layer between the third metal layer and either the first metal layer or the second metal layer is provided in the clad plate material, whereby an area on which either the second metal layer or the first metal layer is exposed can be sufficiently reduced, and hence corrosion of the battery terminal can be suppressed in the case where either the second metal layer or the first metal layer is made of a metal material inferior to that of the third metal layer in corrosion resistance.

In this case, the third metal layer is preferably made of the same type of metal material as that of either the first metal layer or the second metal layer. Even in the case where either the first metal layer or the second metal layer and the third metal layer that are made of the same types of metal materials, as described above, are bonded to both surfaces of either the second metal layer or the first metal layer, the heat of bonding can be inhibited from reaching the interface between the first metal layer and the second metal layer distanced from the exposure surface and the interface between either the second metal layer or the first metal layer and the third metal layer. Therefore, formation of the fragile intermetallic compound (Al—Cu alloy) on the interface between the first metal layer and the second metal layer and the interface between either the second metal layer or the first metal layer and the third metal layer resulting from the heat can be suppressed. Thus, the reduction in the bonding strength of the clad plate material can be further suppressed.

In this case, the overlay clad plate material more preferably further includes a reaction suppressing layer made of Ni or Ni alloy on at least one of an interface between the first metal layer and the second metal layer and an interface between the second metal layer and the third metal layer. According to this structure, even in the case where the heat of bonding the first and second metal layers and the member of the battery to each other reaches the interface between the first metal layer and the second metal layer and the interface between the second metal layer and the third metal layer, the reaction suppressing layer formed on the interface between the first metal layer and the second metal layer can suppress the reaction of the first metal layer with the second metal layer. Furthermore, the reaction suppressing layer formed on the interface between the second metal layer and the third metal layer can suppress reaction of the second metal layer with the third metal layer. Consequently, formation of the fragile intermetallic compound (Al—Cu alloy) on the interface formed with the reaction suppressing layer can be reliably suppressed.

In the aforementioned structure further including the third metal layer, either the first metal layer or the second metal layer preferably includes a first bonding surface bonded to a connecting member configured to connect a battery to an external portion, and the thickness of either the first metal layer or the second metal layer including the first bonding surface is preferably larger than the thickness of the third metal layer. According to this structure, the thickness of either the first metal layer or the second metal layer bonded to the connecting member can be increased, and hence it can be made difficult for the heat to reach the interface between the first metal layer and the second metal layer when the connecting member and either the first metal layer or the second metal layer are bonded to each other. Thus, the formation of the fragile intermetallic compound (Al—Cu alloy) on the interface between the first metal layer and the second metal layer can be effectively suppressed.

A method for manufacturing a battery terminal according to a second aspect of the present invention includes steps of forming an overlay clad plate material by bonding at least a first metal layer made of Al or Al alloy and a second metal layer made of Cu or Cu alloy to each other in the thickness direction and partially removing either the first metal layer or the second metal layer of the overlay clad plate material to form an exposure surface on which either the second metal layer or the first metal layer is partially exposed.

In the method for manufacturing a battery terminal according to the second aspect of the present invention, the exposure surface on which either the second metal layer or the first metal layer is partially exposed can be reliably formed by partially removing either the first metal layer or the second metal layer of the overlay clad plate material in addition to the effects of the battery terminal according to the aforementioned first aspect.

In the aforementioned method for manufacturing a battery terminal according to the second aspect, either the first metal layer or the second metal layer preferably includes a first bonding surface bonded to a connecting member configured to connect a battery to an external portion, and the step of forming the exposure surface preferably includes a step of removing either the first metal layer or the second metal layer in a region excluding a region corresponding to the first bonding surface to form the exposure surface. According to this structure, the exposure surface on which either the second metal layer or the first metal layer is partially exposed can be reliably formed on a first surface on a side formed with the exposure surface.

In the aforementioned method for manufacturing a battery terminal according to the second aspect, the step of forming the exposure surface preferably includes a step of removing either the first metal layer or the second metal layer and partially removing either the second metal layer or the first metal layer to form the exposure surface in a concave shape concave toward either the second metal layer or the first metal layer beyond an interface between the first metal layer and the second metal layer. According to this structure, the exposure surface is not required to be precisely coplanar with the interface between the first metal layer and the second metal layer, and hence the exposure surface on which either the second metal layer or the first metal layer is exposed can be easily formed.

The aforementioned method for manufacturing a battery terminal according to the second aspect preferably further includes a step of forming a protrusion portion protruding toward either the first metal layer or the second metal layer on the overlay clad plate material after the step of forming the overlay clad plate material and before the step of forming the exposure surface, and the step of forming the exposure surface preferably includes a step of partially cutting either the first metal layer or the second metal layer in the protrusion portion to form the exposure surface on the protrusion portion. According to this structure, a member of the battery can be easily bonded to the protrusion portion, as compared with the case where the clad plate material is in the form of a flat plate. Thus, the battery can be easily manufactured from the battery terminal. Furthermore, as compared with the case where the clad plate material is in the form of a flat plate, the protruding protrusion portion is only required to be partially cut, and hence the exposure surface can be easily formed on the protrusion portion.

In this case, the step of forming the protrusion portion preferably includes a step of forming the protrusion portion on the overlay clad plate material by cold forging. According to this structure, work hardening is generated in the clad plate material during the cold forging, and hence the mechanical strength of the battery terminal can be improved as compared with the case of sheet-metal pressing in which sheet metal is pressed while the same is extended. Furthermore, in the case of the cold forging, the volume (thickness) of the clad plate material can be varied depending on a position unlike the case of the sheet-metal pressing, and hence the thickness of the protrusion portion can be increased even when the clad plate material having a small thickness is employed. Thus, the battery terminal can be reduced in weight while the thickness of the protrusion portion is increased. In addition, in the case of the cold forging, the dimension accuracy of the battery terminal can be improved as compared with the case of hot forging in which forging is performed under a high temperature condition of at least a recrystallization temperature.

A battery according to a third aspect of the present invention includes a battery terminal including an overlay clad plate material including at least a first metal layer made of Al or Al alloy and a second metal layer made of Cu or Cu alloy, formed by bonding at least the first metal layer and the second metal layer to each other in the thickness direction, and in the battery terminal, either the first metal layer or the second metal layer of the overlay clad plate material is partially removed to form an exposure surface on which either the second metal layer or the first metal layer is exposed. In the battery according to the third aspect of the present invention, effects similar to those of the battery terminal according to the aforementioned first aspect can be obtained.

The aforementioned battery according to the third aspect preferably further includes an electrode and a current collector configured to connect with the electrode, either the first metal layer or the second metal layer of the battery terminal preferably includes a first bonding surface bonded to a connecting member configured to connect with an external portion, either the second metal layer or the first metal layer of the battery terminal preferably includes a second bonding surface bonded to the current collector, the first bonding surface is preferably formed in a region excluding the exposure surface of a first surface on a side formed with the exposure surface, and the second bonding surface is preferably formed in a region corresponding to the exposure surface. According to this structure, the exposure surface on which either the second metal layer or the first metal layer is partially exposed can be reliably formed on the first surface on the side formed with the exposure surface.

In this case, either the first metal layer or the second metal layer including the first bonding surface is preferably made of the same type of metal material as that of the connecting member, and either the second metal layer or the first metal layer including the second bonding surface is preferably made of the same type of metal material as that of the current collector. According to this structure, the same metal materials are bonded to each other, and hence either the first metal layer or the second metal layer and the connecting member can be easily bonded to each other while the contact resistance between either the first metal layer or the second metal layer and the connecting member is reduced, and either the second metal layer or the first metal layer and the current collector can be easily bonded to each other while the contact resistance between either the second metal layer or the first metal layer and the current collector is reduced. Thus, the battery can be easily prepared.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment

The structure of an assembled battery 100 according to a first embodiment of the present invention is now described with reference to FIGS. 1 to 6.

Figure 1:
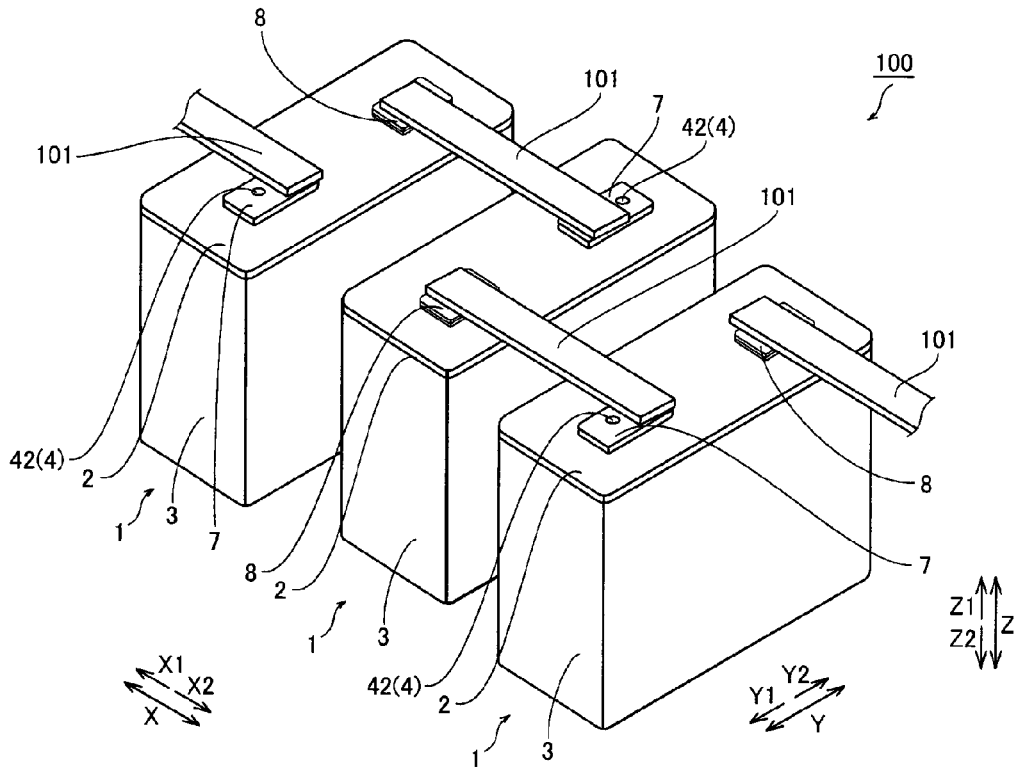
FIG. 1 is a perspective view showing an assembled battery according to a first embodiment of the present invention.

The assembled battery 100 according to the first embodiment of the present invention is a large-sized battery system employed in an electric vehicle (EV), a hybrid electric vehicle (HEV), a residential electric storage system, etc. This assembled battery 100 is constituted by a plurality of lithium ion batteries 1 electrically connected to each other by bus bars 101 in the form of a flat plate, as shown in FIG. 1. The lithium ion batteries 1 are examples of the "battery" in the present invention, and the bus bars 101 are examples of the "connecting member" in the present invention.

In the assembled battery 100, the plurality of lithium ion batteries 1 are aligned along the short-side direction (direction X) of the lithium ion batteries 1 in a plan view. Furthermore, in the assembled battery 100, a lithium ion battery 1 having a positive-electrode terminal 7 described later located on a first side (Y1 side) in a direction Y and a negative-electrode terminal 8 described later located on a second side (Y2 side) in the direction Y and a lithium ion battery 1 having a positive-electrode terminal 7 located on the Y2 side and a negative-electrode terminal 8 located on the Y1 side are alternately arranged along the direction X.

A positive-electrode terminal 7 of a prescribed lithium ion battery 1 is welded (bonded) to a first side (X2 side) in the direction X of a bus bar 101 made of Al extending in the direction X. A negative-electrode terminal 8 of a lithium ion battery 1 (outside) adjacent to the prescribed lithium ion battery 1 is welded to a second side (X1 side) in the direction X of the bus bar 101 made of Al. Thus, the positive-electrode terminal 7 of the lithium ion battery 1 is connected to the negative-electrode terminal 8 of the adjacent lithium ion battery 1 (outside) through the bus bar 101. In this manner, the assembled battery 100 having the plurality of lithium ion batteries 1 connected in series is configured. The bus bar 101 made of Al is employed, whereby the bus bar 101 can be reduced in weight as compared with the case where a bus bar made of Cu is employed, and hence the entire assembled battery 100 employing a plurality of bus bars 101 can be reduced in weight.

Figure 2:
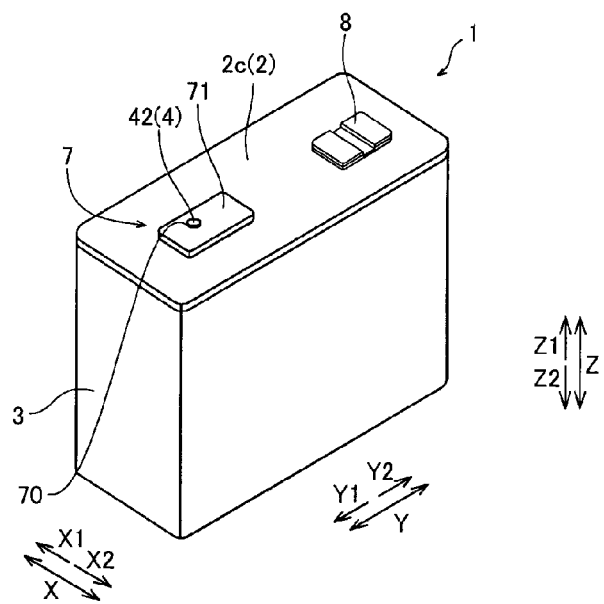
FIG. 2 is a perspective view showing the overall structure of a lithium ion battery according to the first embodiment of the present invention.

The lithium ion battery 1 has a substantially rectangular parallelepiped shape, as shown in FIG. 2. The lithium ion battery 1 includes a cover member 2 arranged on the upper side (Z1 side) and a battery case body 3 arranged on the lower side (Z2 side). These cover member 2 and battery case body 3 each are made of a Ni—plated steel sheet.

Figure 3:
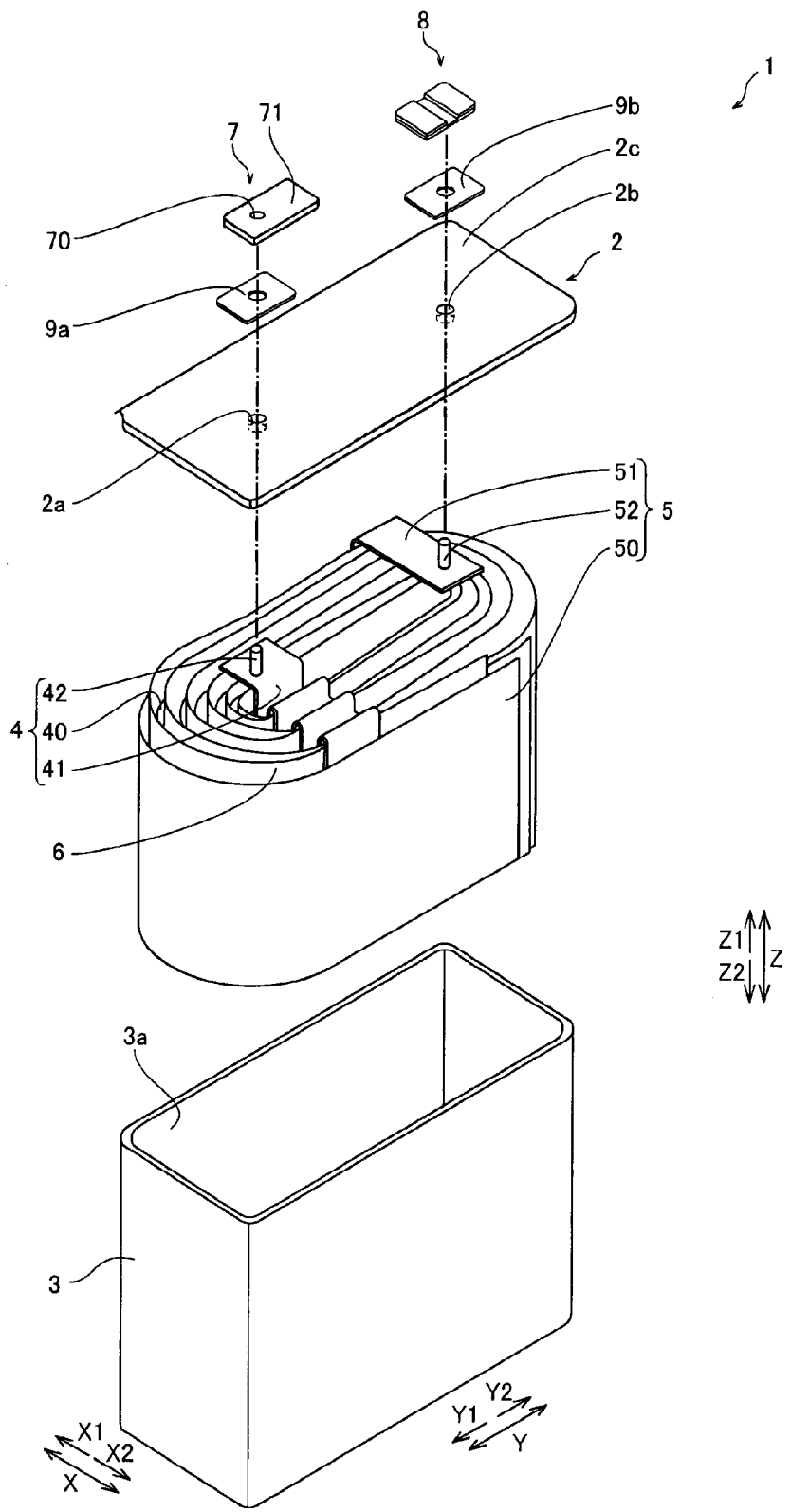
FIG. 3 is an exploded perspective view showing the overall structure of the lithium ion battery according to the first embodiment of the present invention.

The cover member 2 is in the form of a flat plate, as shown in FIG. 3. The cover member 2 is provided with a pair of holes 2a and 2b passing therethrough in the thickness direction (direction Z). The pair of holes 2a and 2b are formed at a prescribed interval in the longitudinal direction (direction Y) of the cover member 2 and are formed in a substantially central portion of the cover member 2 in the short-side direction (direction X). Furthermore, a positive-electrode columnar portion 42 described later and a nega- tive-electrode columnar portion 52 described later are inserted into the pair of holes 2a and 2b from below (Z2 side), respectively.

The lithium ion battery 1 includes a positive-electrode portion 4, a negative-electrode portion 5, and an unshown electrolyte. The positive-electrode portion 4 includes a positive electrode 40 coming into contact with the electrolyte, a current collecting portion 41 electrically connected to the positive electrode 40, and the positive-electrode columnar portion 42 formed on an upper portion of the current collecting portion 41, protruding upward (Z1 side). The positive electrode 40, the current collecting portion 41, and the positive-electrode columnar portion 42 of the positive-electrode portion 4 are made of Al. The negative-electrode portion 5 includes the negative electrode 50 coming into contact with the electrolyte, a current collecting portion 51 electrically connected to the negative electrode 50, and the negative-electrode columnar portion 52 formed on an upper portion of the current collecting portion 51, protruding upward. The negative electrode 50, the current collecting portion 51, and the negative-electrode columnar portion 52 of the negative-electrode portion 5 are made of Cu. The negative electrode 50 is an example of the "electrode" in the present invention, and the negative-electrode columnar portion 52 is an example of the "current collector" in the present invention.

The positive electrode 40 and the negative electrode 50 are stacked in a roll shape in a state where the same are insulated from each other by a separator 6. The battery case body 3 and the cover member 2 are welded to each other in a state where the positive-electrode portion 4 and the negative-electrode portion 5 that are insulated from each other by the separator 6 and the electrolyte are housed in a housing portion 3a of the battery case body 3.

On the upper surface 2c (surface on the Z1 side) on the cover member 2 on the Y1 side, the positive-electrode terminal 7 is arranged through a ring-shaped packing 9a, and on the upper surface 2c of the cover member 2 on the Y2 side, the negative-electrode terminal 8 is arranged through a ring-shaped packing 9b. The packings 9a and 9b are made of a resin material having insulation properties. The positive-electrode columnar portion 42 and the negative-electrode columnar portion 52 are inserted into holes of the packings 9a and 9b, respectively. The negative-electrode terminal 8 is an example of the "battery terminal" in the present invention.

The positive-electrode terminal 7 is made of a flat plate of Al. The positive-electrode terminal 7 has a through-hole 70 formed to pass therethrough in the thickness direction (direction Z) on the first side (Y1 side) in the longitudinal direction (direction Y) and a bus bar bonding portion 71 arranged on the second side (Y2 side). The through-hole 70 is formed in a substantially central portion in the short-side direction (direction X), and the positive-electrode columnar portion 42 of the positive-electrode portion 4 is inserted thereinto from below (Z2 side). The positive-electrode columnar portion 42 is swaged onto the upper surface (surface on the Z1 side) of the positive-electrode terminal 7 in a state where the same is inserted into the through-hole 70. Thus, the positive-electrode portion 4 and the positive-electrode terminal 7 are bonded to each other. As shown in FIG. 1, the bus bar 101 in the form of a flat plate is welded to the bus bar bonding portion 71 by laser welding.

Figure 4:
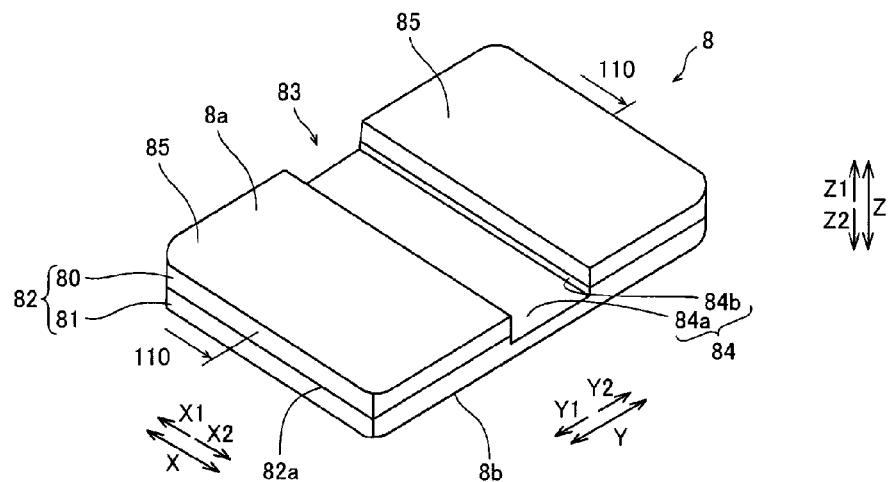
FIG. 4 is a perspective view showing a negative-electrode terminal of the lithium ion battery according to the first embodiment of the present invention.
Figure 5:
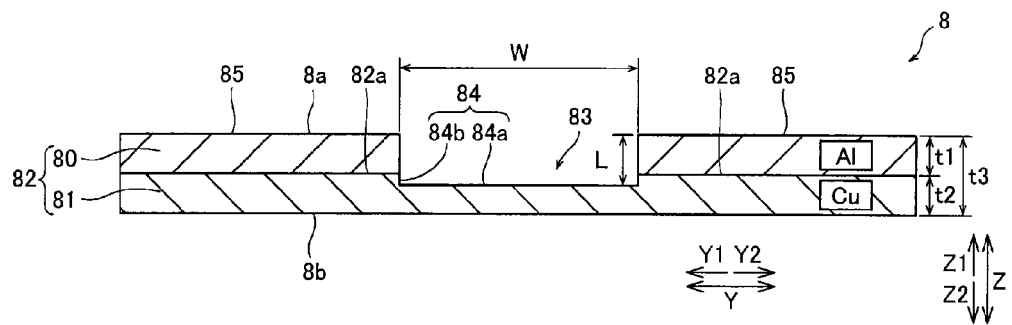
FIG. 5 is a sectional view of the negative-electrode terminal taken along the line 110-110 in FIG. 4.

According to the first embodiment, the negative-electrode terminal 8 is made of a rectangular flat plate in a plan view and is made of a two-layered clad plate material 82 in which an Al layer 80 made of Al and a Cu layer 81 made of Cu are bonded to each other in the thickness direction (direction Z), as shown in FIGS. 4 and 5. In this clad plate material 82, the Al layer 80 is stacked on the substantially entire upper surface (Z1 side) (excluding a bottom surface 84a described later) of the Cu layer 81. In other words, the clad plate material 82 is a so-called overlay clad plate material 82. The Al layer 80 is arranged on a surface 8a of the negative-electrode terminal 8 on the Z1 side, and the Cu layer 81 is arranged on a surface 8b of the negative-electrode terminal 8 on the Z2 side. The surface 8a and the surface 8b serve as the front and the back. The Al layer 80 is an example of the "first metal layer" or "either the first metal layer or the second metal layer" in the present invention. The Cu layer 81 is an example of the "second metal layer" or "either the second metal layer or the first metal layer" in the present invention.

As shown in FIG. 5, the thickness t1 of the Al layer 80 in the direction Z and the thickness t2 of the Cu layer 81 in the direction Z are substantially equal to each other. The thickness t3 of the clad plate material 82 in the direction Z is about 2.5 mm.

The clad plate material 82 constituting the negative-electrode terminal 8 is formed with a groove 83 concaved along arrow Z2 in the surface 8a on the Z1 side. This groove 83 is formed to extend in the short-side direction (direction X) of the negative-electrode terminal 8 with a constant width W (see FIG. 5) in the longitudinal direction (direction Y) of the negative-electrode terminal 8, as shown in FIG. 4. In a plan view, the groove 83 is formed in a substantially central portion of the negative-electrode terminal 8 in the direction Y, and flat surface portions 85 are formed on both sides of the groove 83 in the direction Y. On the other hand, the surface 8b of the clad plate material 82 on the Z2 side is flattened.

According to the first embodiment, the groove 83 is formed by partially removing (cutting) the Al layer 80 arranged on the Z1 side and an upper portion on the Z1 side of the Cu layer 81 arranged on the Z2 side from the Z1 side. Consequently, the length (depth) L of the groove 83 in the thickness direction (direction Z) is rendered larger than the thickness t1 of the Al layer 80. Thus, the Cu layer 81 arranged on the surface 8b is exposed on the bottom surface 84a of the groove 83 and lower portions (exposure side surfaces 84b) of side surfaces of the groove 83. An exposure surface 84 constituted by these bottom surface 84a and exposure side surfaces 84b is formed in a concave shape concaved toward the surface 8b (Z2 side) beyond an interface 82a (interface 82a between the Al layer 80 and the Cu layer 81) of the clad plate material 82. The height position of the bottom surface 84a in the direction Z is lower (Z2 side) than the height position of the interface 82a.

Figure 6:
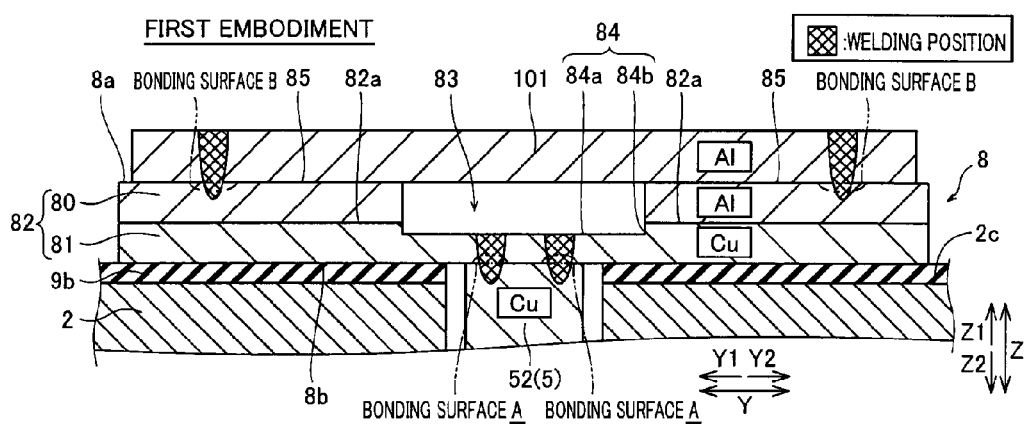
FIG. 6 is a sectional view showing a state where the negative-electrode terminal of the lithium ion battery according to the first embodiment of the present invention is bonded to a negative-electrode portion and a bus bar.

As shown in FIG. 6, the negative-electrode terminal 8 is arranged on the upper surface 2c (packing 9b) of the cover member 2 while the surface 8a (Al layer 80) formed with the groove 83 is located on the upper side (Z1 side) and the flattened surface 8b (Cu layer 81) is located on the lower side (Z2 side).

The upper end of the negative-electrode columnar portion 52 made of Cu is bonded (welded) to bonding surfaces A formed on the flattened surface 8b (Cu layer 81) in a region corresponding to the exposure surface 84 (on a side opposite to the bottom surface 84a) by laser welding. In other words, the bonding surfaces A and the negative-electrode portion 5 that are made of the same metal material (Cu) are bonded to each other. The bonding surfaces A and the upper end of the negative-electrode columnar portion 52 are bonded to each other by emitting (scanning) a laser beam downward (along arrow Z2) to the bottom surface 84a. At this time, there is no interface 82a between the Al layer 80 and the Cu layer 81 at positions (groove 83) corresponding to the bonding surfaces A, and hence the intensity and emission time of the laser beam are not required to be precisely adjusted. Thus, formation of a fragile intermetallic compound (Al—Cu alloy) on the interface 82a is suppressed. The bonding surfaces A are examples of the "second bonding surface" in the present invention.

The lower surface of the bus bar 101 in the form of a flat plate made of Al is bonded (welded) to bonding surfaces B formed on the flat surface portions 85 (Al layer 80) of the surface 8a by laser welding. In other words, the bonding surfaces B and the bus bar 101 that are made of the same metal material (Al) are bonded to each other. The bonding surfaces B and the lower surface of the bus bar 101 are bonded by emitting (scanning) the laser beam from the upper surface side (Z1 side) of the bus bar 101 to the Z2 side. At this time, the intensity and emission time of the laser beam are adjusted to inhibit high heat of laser welding from reaching the interface 82a of the clad plate material 82 corresponding to the bonding surfaces B. Thus, the formation of a fragile Al—Cu alloy on the interface 82a is suppressed. The bonding surfaces B are examples of the "first bonding surface" in the present invention.

According to the first embodiment, the following effects can be obtained.

According to the first embodiment, as hereinabove described, the clad plate material 82 constituting the negative-electrode terminal 8 is the so-called overlay clad plate material 82 in which the Al layer 80 and the Cu layer 81 are bonded to each other in the thickness direction in a state where the Al layer 80 is arranged on the entire surface 8a and the Cu layer 81 is arranged on the entire surface 8b. Thus, the overlay clad plate material 82 can be easily prepared simply by stacking the Al layer 80 and the Cu layer 81 and bonding the same to each other without precisely controlling the positional relationship between the Al layer 80 and the Cu layer 81 unlike the case where the negative-electrode terminal 8 is made of an inlay clad material, and hence the negative-electrode terminal 8 can be easily prepared. Consequently, the mass productivity of the negative-electrode terminal 8 can be improved.

According to the first embodiment, the negative-electrode terminal 8 is made of the overlay clad plate material 82 in which the Al layer 80 made of Al and the Cu layer 81 made of Cu are bonded to each other, whereby the bus bar 101 made of Al can be bonded to the Al layer 80 made of Al, and the negative-electrode columnar portion 52 of the negative-electrode portion 5 made of Cu can be bonded to the Cu layer 81 made of Cu. Thus, the bus bar 101 and the negative-electrode portion 5 that are made of the different metal materials can be easily electrically connected to each other.

According to the first embodiment, the Cu layer 81 arranged on the surface 8b is exposed on the exposure surface 84 of the surface 8a, whereby there is no interface 82a between the Al layer 80 and the Cu layer 81 on a portion of the overlay clad plate material 82 formed with the exposure surface 84, and hence heat of bonding can be inhibited from reaching the interface 82a between the Al layer 80 and the Cu layer 81 distanced from the exposure surface 84 when the negative-electrode columnar portion 52 is bonded to the portion formed with the exposure surface 84. Consequently, the formation of the fragile intermetallic compound (Al—Cu alloy) on the interface 82a can be suppressed.

According to the first embodiment, the concave exposure surface 84 on which the Cu layer 81 is exposed, constituted by the bottom surface 84a and the exposure side surfaces 84b is exposed on the surface 8a on the Z1 side by partially removing (cutting) the Al layer 80 arranged on the Z1 side and the upper portion on the Z1 side of the Cu layer 81 arranged on the Z2 side. Thus, the exposure surface 84 on which the Cu layer 81 arranged on the surface 8b is partially exposed can be reliably formed on the surface 8a on the Z1 side even in the case where the overlay clad plate material 82 in which the Al layer 80 is arranged on the entire surface 8a and the Cu layer 81 is arranged on the entire surface 8b is employed.

According to the first embodiment, the upper end of the negative-electrode columnar portion 52 made of Cu is bonded to the bonding surfaces A formed on the flattened surface 8b (Cu layer 81) in the region corresponding to the exposure surface 84 (on the side opposite to the bottom surface 84a), and the lower surface of the bus bar 101 in the form of a flat plate made of Al is bonded to the bonding surfaces B formed on the flat surface portions 85 (Al layer 80) of the surface 8a. Thus, the bonding surfaces A formed on the flattened surface 8b opposite to the bottom surface 84a (corresponding to the bottom surface 84a) and the bonding surfaces B formed on the surface 8a (flat surface portions 85) excluding the exposure surface 84 (groove 83) can be sufficiently separated from each other, and hence the negative-electrode columnar portion 52 can be easily bonded to the bonding surfaces A, and the bus bar 101 can be easily bonded to the bonding surfaces B. Consequently, the lithium ion battery 1 can be easily prepared.

According to the first embodiment, the upper end of the negative-electrode columnar portion 52 made of the same metal (Cu) is bonded to the bonding surfaces A formed on the surface 8b (Cu layer 81) opposite to the bottom surface 84a, and the lower surface of the bus bar 101 made of the same metal (Al) is bonded to the bonding surfaces B formed on the flat surface portions 85 (Al layer 80) of the surface 8a. Thus, the same metal materials are bonded to each other, and hence the Al layer 80 and the bus bar 101 can be easily bonded to each other while the contact resistance between the Al layer 80 and the bus bar 101 made of Al is reduced, and the Cu layer 81 and the negative-electrode columnar portion 52 made of Cu can be easily bonded to each other while the contact resistance between the Cu layer 81 and the negative-electrode columnar portion 52 made of Cu is reduced.

According to the first embodiment, the exposure surface 84 constituted by the bottom surface 84a and the exposure side surfaces 84b is formed in the concave shape concaved toward the surface 8b (Z2 side) beyond the interface 82a between the Al layer 80 and the Cu layer 81, whereby the exposure surface 84 is not required to be precisely coplanar with the interface 82a when the Cu layer 81 is exposed on the surface 8a on the Z1 side. Thus, the exposure surface 84 on which the Cu layer 81 is exposed can be easily formed.

Cu is a material not much suitable for welding since a fragile oxide is formed by oxidation, the electric resistance is small, and Cu easily reflects light. In general, therefore, Cu is plated with Ni when Cu is welded. Furthermore, Cu is required to be plated with Ni in order to improve the corrosion resistance since Cu is lower in corrosion resistance than Al. On the other hand, according to the first embodiment, as hereinabove described, the bus bar 101 made of Al is employed, whereby the bus bar 101 is not required to be plated with Ni, unlike the case where a bus bar made of Cu is employed.

A process for manufacturing the lithium ion battery 1 and the assembled battery 100 according to the first embodiment of the present invention is now described with reference to FIGS. 1 to 7.

First, a rolled Al plate (not shown) having a prescribed thickness and a rolled Cu plate (not shown) having a prescribed thickness are prepared. The width of the Al plate and the width of the Cu plate are rendered substantially the same. While the rolled Cu plate is stacked on the entire surface of the rolled Al plate in the thickness direction, the Al plate and the Cu plate are continuously pressure-bonded to each other with a prescribed rolling reduction and are held for one minute under a temperature of about 500° C., whereby diffusion annealing is performed. Thus, the rolled clad plate material 82 having a thickness of about 2.5 mm is formed. This rolled clad plate material 82 is the so-called overlay clad plate material 82 in which the Al layer 80 and the Cu layer 81 are bonded to each other in the thickness direction in the state where the Al layer 80 is arranged on the entire surface 8a and the Cu layer 81 is arranged on the entire surface 8b.

Figure 7:
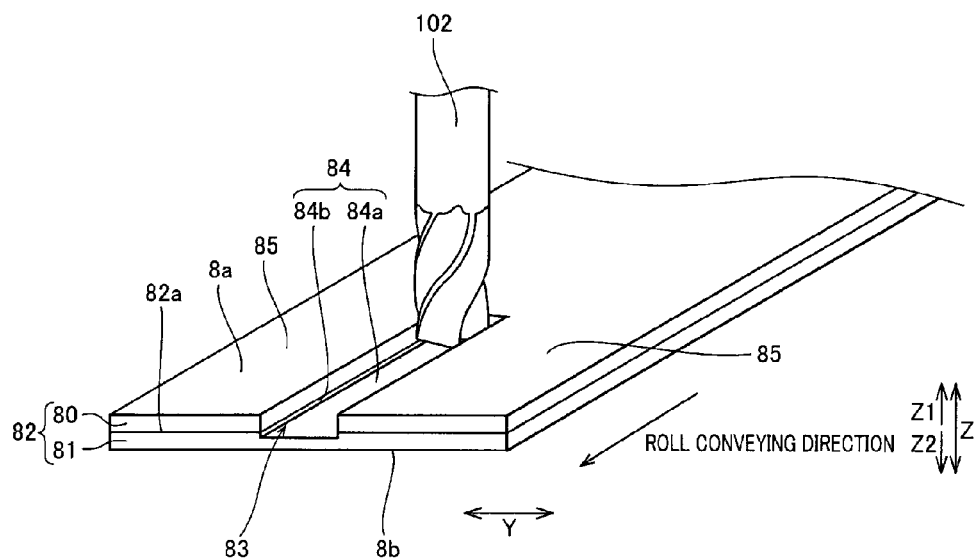
FIG. 7 is a perspective view for illustrating a method for manufacturing the negative-electrode terminal according to the first embodiment of the present invention.

In a manufacturing method according to the first embodiment, the single groove 83 is formed along the extensional direction of a roll (roll conveying direction) in a substantially central portion of the rolled overlay clad plate material 82 in the width direction, as shown in FIG. 7. Specifically, an end mill 102 capable of cutting the clad plate material 82 in the thickness direction (direction Z) is arranged in the substantially central portion of the rolled clad plate material 82 in the width direction (direction Y), which is a region other than regions corresponding to the bonding surfaces B (see FIG. 6) connected with the bus bar 101. At this time, the end mill 102 is arranged to cut the overlay clad plate material 82 by a length L (see FIG. 5) in the thickness direction from the surface 8a of the overlay clad plate material 82 on the Z1 side.

The overlay clad plate material 82 is cut by the end mill 102 while the rolled clad plate material 82 is conveyed in the roll conveying direction.

Thus, the Al layer 80 arranged on the Z1 side and the upper portion on the Z1 side of the Cu layer 81 arranged on the Z2 side are partially removed (cut) in the substantially central portion of the rolled clad plate material 82 in the width direction (direction Y). Consequently, the single groove 83 extending along the roll conveying direction is continuously formed in the substantially central portion of the rolled clad plate material 82 in the width direction. At this time, only the single groove 83 is formed, whereby a plurality of grooves are not required to be positioned with respect to each other unlike the case where the plurality of grooves are formed at a time, and hence the single groove 83 can be easily formed. Thus, the concave exposure surface 84 on which the Cu layer 81 is exposed, constituted by the bottom surface 84a and the exposure side surfaces 84b is continuously formed in the groove 83 to be exposed on the surface 8a on the Z1 side.

Thereafter, the rolled overlay clad plate material 82 formed with the groove 83 is rectangularly stamped out by a press-cutting machine (not shown). At this time, the clad plate material 82 is stamped out such that the groove 83 is located in the substantially central portion of the rolled clad plate material 82 in the width direction. Consequently, the negative-electrode terminal 8 shown in FIGS. 4 and 5 is prepared. A plurality of negative-electrode terminals 8 each having the groove 83 (exposure surface 84) can be continuously prepared by the aforementioned manufacturing process, and hence the negative-electrode terminal 8 can be easily mass-produced.

The negative-electrode terminal 8 and the negative-electrode columnar portion 52 are bonded to each other by laser welding with a laser beam generator (not shown). Specifically, the negative-electrode columnar portion 52 is arranged such that the upper end of the negative-electrode columnar portion 52 comes into contact with the bonding surfaces A of the flattened surface 8b opposite to the bottom surface 84a, as shown in FIG. 6. The laser beam is emitted (scanned) downward (along arrow Z2) to the bottom surface 84a of the groove 83 such that the upper end of the negative-electrode columnar portion 52 is bonded to the bonding surfaces A. Thus, the negative-electrode terminal 8 and the negative-electrode portion 5 are bonded (welded) to each other.

As shown in FIG. 3, the positive-electrode terminal 7 having the through-hole 70, made of Al is prepared. The positive-electrode columnar portion 42 is swaged onto the upper surface (surface on the Z1 side) of the positive-electrode terminal 7 in the state where the positive-electrode columnar portion 42 of the positive-electrode portion 4 is inserted into the through-hole 70. Thus, the positive-electrode terminal 7 and the positive-electrode portion 4 are bonded to each other. Thereafter, the battery case body 3 and the cover member 2 are welded to each other in the state where the positive-electrode portion 4 and the negative-electrode portion 5 that are insulated from each other by the separator 6 and the electrolyte are housed in the housing portion 3a of the battery case body 3. Thus, the lithium ion battery 1 is manufactured, as shown in FIG. 2.

Thereafter, the plurality of lithium ion batteries 1 are arranged along the direction X, as shown in FIG. 1. Then, the positive-electrode terminal 7 of the lithium ion battery 1 and the negative-electrode terminal 8 of the adjacent lithium ion battery 1 are bonded to each other by the bus bar 101 in the form of a flat plate. Specifically, the bonding surfaces B formed on the flat surface portions 85 (Al layer 80) of the surface 8a and the lower surface of the bus bar 101 in the form of a flat plate on the X1 side are bonded to each other by laser welding with the laser beam generator adjusted to prescribed intensity and emission time in a state where the lower surface of the bus bar 101 comes into contact with the bonding surfaces B. Thus, the negative-electrode terminal 8 and the bus bar 101 are bonded (welded) to each other. Furthermore, the bus bar bonding portion 71 of the positive-electrode terminal 7 and the lower surface of the bus bar 101 on the X2 side are welded to each other by laser welding with the laser beam generator. Thus, the positive-electrode terminal 7 and the bus bar 101 are bonded (welded) to each other. Consequently, the assembled battery 100 in which the plurality of lithium ion batteries 1 are connected in series by the plurality of bus bars 101 made of Al is manufactured.

Modification of First Embodiment

A modification of the first embodiment of the present invention is now described with reference to FIGS. 8 and 9. In this modification of the first embodiment, cutout portions 283 having exposed exposure surfaces 284 are formed on both ends of a negative-electrode terminal 208 in a direction Y, unlike in the aforementioned first embodiment in which the single groove 83 having the exposed exposure surface 84 is formed in the substantially central portion in the direction Y. The negative-electrode terminal 208 is an example of the "battery terminal" in the present invention.

Figure 8:
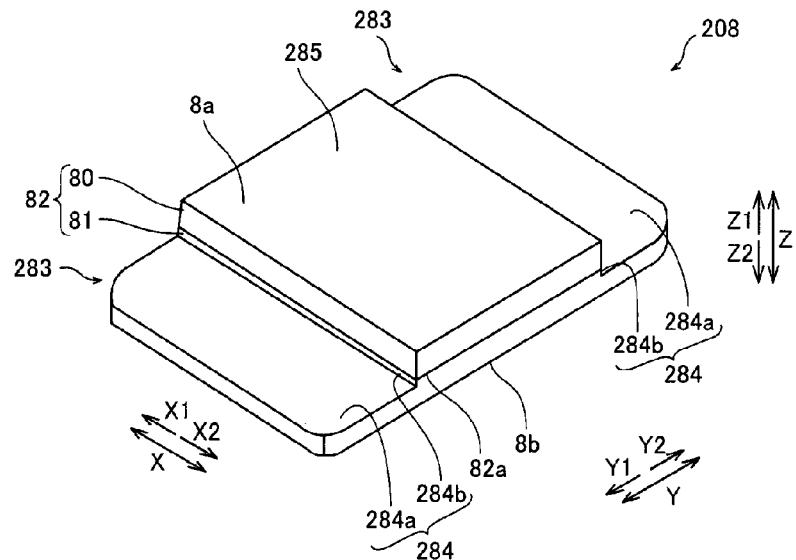
FIG. 8 is a perspective view showing a negative-electrode terminal according to a modification of the first embodiment of the present invention.

According to the modification of the first embodiment of the present invention, the negative-electrode terminal 208 is made of an overlay clad plate material 82 in which an Al layer 80 and a Cu layer 81 are bonded to each other in the thickness direction (direction Z), as shown in FIG. 8. The cutout portions 283 are formed on both sides of the clad plate material 82 in the longitudinal direction (direction Y). The pair of cutout portions 283 are formed to extend in the short-side direction (direction X) of the negative-electrode terminal 208 with a constant width in the direction Y of the negative-electrode terminal 208. A flat surface portion 285 is formed in a central portion of the negative-electrode terminal 208 in the direction Y sandwiched between the pair of cutout portions 283.

According to the modification of the first embodiment, the pair of cutout portions 283 are formed by partially removing (cutting) the Al layer 80 arranged on a Z1 side and an upper portion on the Z1 side of the Cu layer 81 arranged on a Z2 side. Thus, on bottom surfaces 284a of the cutout portions 283 and lower portions (exposure side surfaces 284b) of side surfaces closer to the flat surface portion 285, the Cu layer 81 arranged on a surface 8b is exposed. An end mill 102 (see FIG. 7) is arranged at two positions separated from each other in the width direction (direction Y) of the rolled overlay clad plate material 82 (see FIG. 7) and forms a pair of grooves, and thereafter the rolled clad plate material 82 is rectangularly stamped out such that both ends in the direction Y are located in the pair of grooves, whereby the negative-electrode terminal 208 having the pair of cutout portions 283 is formed.

Figure 9:
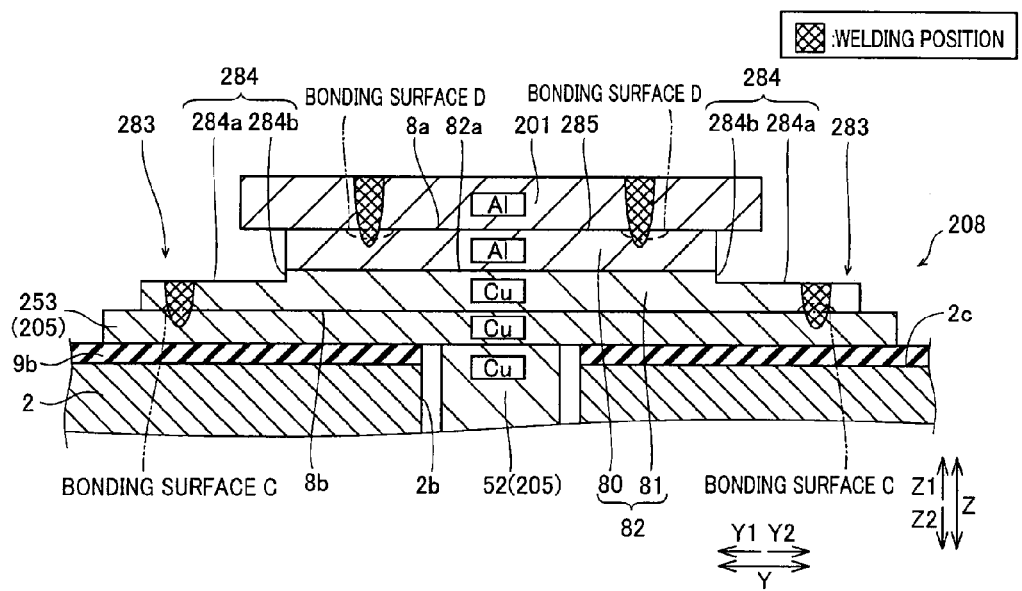
FIG. 9 is a sectional view showing a state where the negative-electrode terminal according to the modification of the first embodiment of the present invention is bonded to a negative-electrode portion and a bus bar.

As shown in FIG. 9, a negative-electrode portion 205 further includes a terminal connecting plate 253 in the form of a flat plate having a lower surface bonded to an upper end of the negative-electrode columnar portion 52 in addition to the negative electrode 50, the current collecting portion 51, and the negative-electrode columnar portion 52 (see FIG. 3) according to the aforementioned first embodiment. This terminal connecting plate 253 is made of Cu and is arranged on the upper surface 2c (packing 9b) of a cover member 2. The terminal connecting plate 253 is an example of the "current collector" in the present invention.

The upper surface of the terminal connecting plate 253 made of Cu is bonded (welded) to bonding surfaces C formed on the surface 8b (Cu layer 81) in regions corresponding to the exposure surfaces 284 (on a side opposite to the exposure surfaces 284) by laser welding. The bonding surfaces C and the upper surface of the terminal connecting plate 253 are bonded to each other by emitting (scanning) a laser beam downward (along arrow Z2) to the bottom surfaces 284a.

The lower surface of a bus bar 201 in the form of a flat plate made of Al is bonded (welded) to bonding surfaces D formed on the flat surface portion 285 (Al layer 80) of a surface 8a by laser welding. The bus bar 201 according to the modification of the first embodiment is not required to be arranged on the upper side of the cutout portions 283 as compared with the bus bar 101 required to be arranged to cover the upper side of the groove 83 as in the aforementioned first embodiment, and hence the length of the bus bar 201 in the direction Y can be reduced. The bonding surfaces C and D are examples of the "second bonding surface" and the "first bonding surface" in the present invention, respectively, and the bus bar 201 is an example of the "connecting member" in the present invention.

The remaining structure and effects of the modification of the first embodiment are similar to those of the aforementioned first embodiment.

Second Embodiment

A second embodiment of the present invention is now described with reference to FIG. 10. In a negative-electrode terminal 308 according to this second embodiment, a Ni layer 386 is arranged between an Al layer 80 and a Cu layer 81, unlike in the aforementioned first embodiment. The negative-electrode terminal 308 is an example of the "battery terminal" in the present invention, and the Ni layer 386 is an example of the "reaction suppressing layer" in the present invention.

Figure 10:
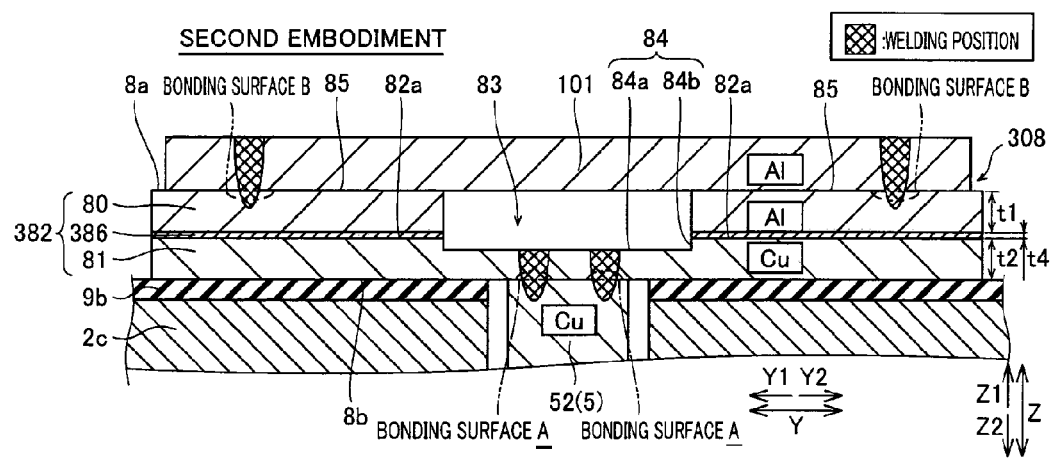
FIG. 10 is a sectional view showing a state where a negative-electrode terminal according to a second embodiment of the present invention is bonded to a negative-electrode portion and a bus bar.

The negative-electrode terminal 308 according to the second embodiment of the present invention is made of a three-layered clad plate material 382 in which the Al layer 80 made of Al, the Cu layer 81 made of Cu, and the Ni layer 386 made of Ni, formed on an interface 82a between the Al layer 80 and the Cu layer 81 are bonded to each other in the thickness direction (direction Z), as shown in FIG. 10. This Ni layer 386 has a function of suppressing formation of a fragile Al—Cu alloy by suppressing reaction of the Al layer 80 with the Cu layer 81 resulting from heat of bonding or the like. The thickness t4 of the Ni layer 386 in the direction Z is smaller than the thickness t1 of the Al layer 80 and the thickness t2 of the Cu layer 81 and is about 100 μm. The remaining structure of the second embodiment is similar to that of the aforementioned first embodiment.

According to the second embodiment, the following effects can be obtained.

According to the second embodiment, as hereinabove described, the clad plate material 382 constituting the negative-electrode terminal 308 is made of a so-called overlay clad plate material 382 in which the Al layer 80, the Cu layer 81, and the Ni layer 386 are bonded to each other in the thickness direction in a state where the Al layer 80 is arranged on an entire surface 8a and the Cu layer 81 is arranged on an entire surface 8b, whereby similarly to the aforementioned first embodiment, the negative-electrode terminal 308 can be easily prepared from the overlay clad plate material 382, the mass productivity of the negative-electrode terminal 308 can be improved, and a bus bar 101 and a negative-electrode portion 5 that are made of different metal materials can be easily electrically connected to each other. Furthermore, the Cu layer 81 arranged on the surface 8b is exposed on an exposure surface 84 of the surface 8a, whereby formation of a fragile intermetallic compound (Al—Cu alloy) on the interface 82a can be suppressed, similarly to the aforementioned first embodiment.

According to the second embodiment, the Ni layer 386 made of Ni is provided on the interface 82a between the Al layer 80 and the Cu layer 81, whereby even in the case where heat of bonding the Al layer 80 and the bus bar 101 to each other and heat of bonding the Cu layer 81 and a negative-electrode columnar portion 52 to each other reach the interface 82a between the Al layer 80 and the Cu layer 81, the Ni layer 386 made of Ni can suppress the reaction of the Al layer 80 with the Cu layer 81, and hence the formation of the fragile Al—Cu alloy can be reliably suppressed. The remaining effects of the second embodiment are similar to those of the aforementioned first embodiment.

Third Embodiment

A third embodiment of the present invention is now described with reference to FIGS. 11 to 13. In a negative-electrode terminal 408 according to this third embodiment, an exposure surface 484a is formed on a protrusion portion 487 formed on a clad plate material 482, unlike in the aforementioned first embodiment. The negative-electrode terminal 408 is an example of the "battery terminal" in the present invention.

Figure 11:
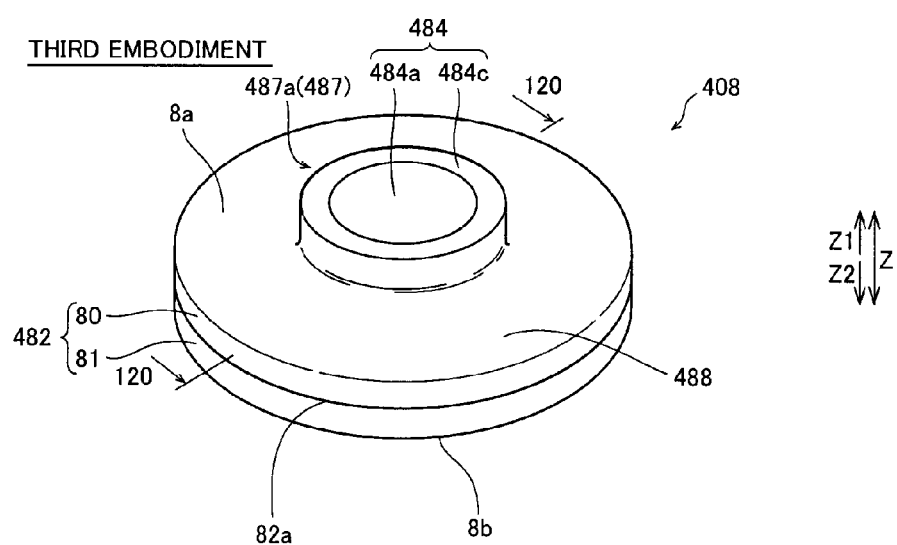
FIG. 11 is a perspective view showing a negative-electrode terminal according to a third embodiment of the present invention.

The overlay clad plate material 482 constituting the negative-electrode terminal 408 according to the third embodiment of the present invention is formed in a disc shape, as shown in FIG. 11. The clad plate material 482 has the protrusion portion 487 protruding upward (Z1 side), formed in a central portion of the clad plate material 482 and a ring-shaped flange 488 formed to surround the protrusion portion 487. This protrusion portion 487 is formed by pressing upward from below (Z2 side) with an unshown pressing machine and has a convex portion 487a protruding to the Z1 side on a surface 8a on the Z1 side and a concave portion 487b concave to the Z1 side on a surface 8b on the Z2 side. The concave portion 487b is configured such that a negative-electrode columnar portion 52 of a negative-electrode portion 5 is inserted thereinto.

Figure 12:
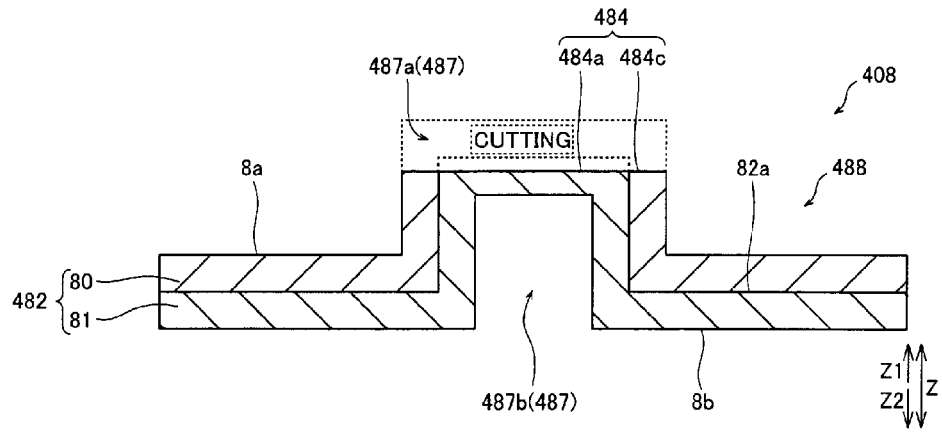
FIG. 12 is a sectional view of the negative-electrode terminal taken along the line 120-120 in FIG. 11.

As shown in FIG. 12, an unshown end mill removes (cuts) all of an upper portion of the protrusion portion 487 on the Z1 side, whereby a cut surface 484 including the exposure surface 484a on which a Cu layer 81 is exposed and a cross-sectional surface 484c of an Al layer 80 is exposed on the surface 8a on the Z1 side to which the protrusion portion 487 protrudes. This cut surface 484 is substantially circularly formed in a plan view and is substantially flattened. The cross-sectional surface 484c is formed in a ring shape in the plan view, and the exposure surface 484a is substantially circularly formed inside the ring-shaped cross-sectional surface 484c. According to the third embodiment, the exposure surface 484a on which the Cu layer 81 is exposed is formed after the protrusion portion 487 is formed on the clad plate material 482 in the form of a flat plate.

Figure 13:
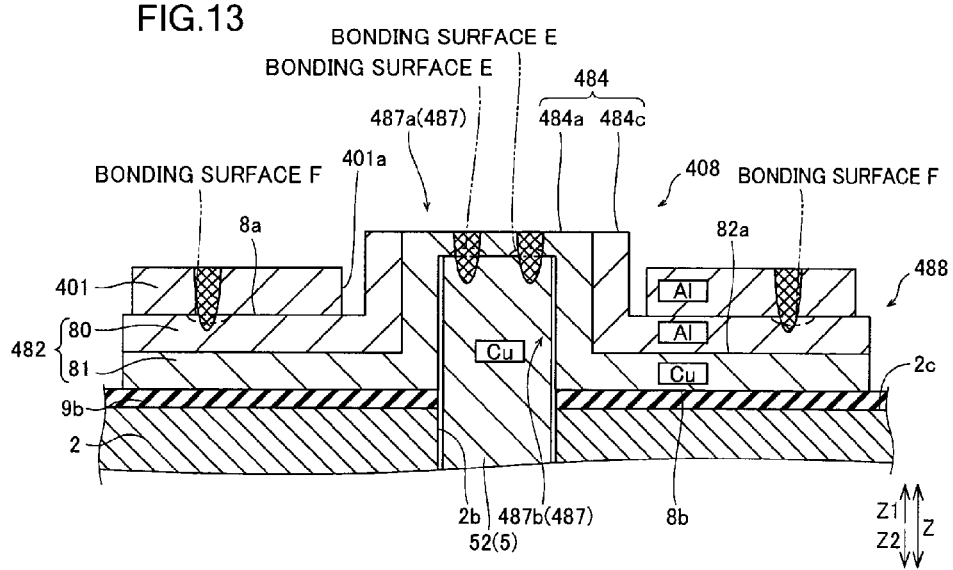
FIG. 13 is a sectional view showing a state where a negative-electrode terminal according to a third embodiment of the present invention is bonded to a negative-electrode portion and a bus bar.

As shown in FIG. 13, a bus bar 401 made of Al is formed with a through-hole 401a into which the protrusion portion 487 of the negative-electrode terminal 408 is inserted. The bus bar 401 is an example of the "connecting member" in the present invention.

An upper end of the negative-electrode columnar portion 52 made of Cu inserted into the concave portion 487b is bonded (welded) to bonding surfaces E formed on the surface 8b (Cu layer 81) of the concave portion 487b of the protrusion portion 487 located in a region corresponding to the exposure surface 484a (on a side opposite to the exposure surface 484a) by laser welding. The bonding surfaces E and the upper end of the negative-electrode columnar portion 52 are bonded to each other by emitting (scanning) a laser beam downward (along the Z2 side) to the exposure surface 484a. At this time, there is no interface 82a between the Al layer 80 and the Cu layer 81 at positions corresponding to the bonding surfaces E, and hence the intensity and emission time of the laser beam is not required to be precisely adjusted. The bonding surfaces E are examples of the "second bonding surface" in the present invention.

The lower surface of the bus bar 401 made of Al is bonded (welded) to bonding surfaces F formed on the surface 8a (Al layer 80) of the flange 488 by laser welding in a state where the protrusion portion 487 of the negative-electrode terminal 408 is inserted into the through-hole 401a of the bus bar 401. The bonding surfaces F are examples of the "first bonding surface" in the present invention. The remaining structure of the third embodiment is similar to that of the aforementioned first embodiment.

According to the third embodiment, the following effects can be obtained.

According to the third embodiment, as hereinabove described, the clad plate material 482 constituting the negative-electrode terminal 408 is made of the so-called overlay clad plate material 482 in which the Al layer 80 and the Cu layer 81 are bonded to each other in the thickness direction in a state where the Al layer 80 is arranged on the entire surface 8a and the Cu layer 81 is arranged on the entire surface 8b, whereby similarly to the aforementioned first embodiment, the negative-electrode terminal 408 can be easily prepared from the overlay clad plate material 482, the mass productivity of the negative-electrode terminal 408 can be improved, and the bus bar 401 and the negative-electrode portion 5 that are made of different metal materials can be easily electrically connected to each other. Furthermore, the Cu layer 81 arranged on the surface 8b is exposed on the exposure surface 484a of the surface 8a, whereby formation of a fragile intermetallic compound (Al—Cu alloy) on the interface 82a can be suppressed, similarly to the aforementioned first embodiment.

According to the third embodiment, the Cu layer 81 is exposed on the exposure surface 484a formed on the surface 8a on the Z1 side to which the protrusion portion 487 protrudes, and the upper end of the negative-electrode columnar portion 52 made of Cu inserted into the concave portion 487b is bonded to the bonding surfaces E formed on the surface 8b (Cu layer 81) of the concave portion 487b of the protrusion portion 487 located on the side opposite to the exposure surface 484a. Thus, there is no interface 82a between the Al layer 80 and the Cu layer 81 in a region corresponding to the bonding surfaces E, and hence heat of bonding can be prevented from reaching the interface 82a in the region corresponding to the bonding surfaces E when the negative-electrode columnar portion 52 is bonded to the bonding surfaces E. Thus, the formation of the fragile Al—Cu alloy can be prevented in the region corresponding to the bonding surfaces E.

According to the third embodiment, the protrusion portion 487 protruding upward is formed, whereby the protrusion portion 487 and the flange 488 can be formed at different positions in the thickness direction (direction Z) as compared with the case where the clad plate material is in the form of a flat plate, and hence the bus bar 401 and the negative-electrode columnar portion 52 can be easily bonded to the protrusion portion 487 and the flange 488. Thus, a lithium ion battery and an assembled battery can be easily manufactured from the negative-electrode terminal 408.

According to the third embodiment, the lower surface of the bus bar 401 made of Al is bonded to the bonding surfaces F formed on the surface 8a (Al layer 80) of the flange 488 in the state where the protrusion portion 487 of the negative-electrode terminal 408 is inserted into the through-hole 401a of the bus bar 401, whereby even in the case where the protrusion portion 487 protruding upward is formed on the clad plate material 482, an increase in the size of the assembled battery in the thickness direction (direction Z) can be suppressed by inserting the protrusion portion 487 into the through-hole 401a of the bus bar 401. The remaining effects of the third embodiment are similar to those of the aforementioned first embodiment.

Processes for manufacturing and bonding the negative-electrode terminal 408 according to the third embodiment of the present invention are now described with reference to FIGS. 12 and 13.

First, the overlay clad plate material 82 (see FIG. 7) in which the Al layer 80 and the Cu layer 81 are bonded to each other in the thickness direction is prepared, similarly to the aforementioned first embodiment.

In a manufacturing method according to the third embodiment, a prescribed portion of the clad plate material 82 is pressed upward (Z1 side) from below (Z2 side) with the unshown pressing machine, whereby the protrusion portion 487 having the convex portion 487a protruding to the Z1 side on the surface 8a on the Z1 side and the concave portion 487b concave to the Z1 side on the surface 8b on the Z2 side is formed, as shown in FIG. 12. Then, the Al layer 80 of the upper portion of the protrusion portion 487 on the Z1 side and a part of the Cu layer 81 are removed by the unshown end mill, whereby the cut surface 484 including the exposure surface 484a on which the Cu layer 81 is exposed and the cross-sectional surface 484c of the Al layer 80 is exposed. Thus, the negative-electrode terminal 408 shown in FIG. 12 is prepared. At this time, as compared with the case where the clad plate material is in the form of a flat plate, the protruding protrusion portion 487 is only required to be partially cut, and hence the exposure surface 484a can be easily formed on the protrusion portion 487.

Then, the negative-electrode terminal 408 and the negative-electrode columnar portion 52 are bonded to each other by laser welding with a laser beam generator (not shown). Specifically, the negative-electrode columnar portion 52 is arranged such that the upper end of the negative-electrode columnar portion 52 comes into contact with the bonding surfaces E of the protrusion portion 487, as shown in FIG. 13. Then, the laser beam is emitted (scanned) such that the upper end of the negative-electrode columnar portion 52 is bonded to the bonding surfaces E. Thus, the negative-electrode terminal 408 and the negative-electrode portion 5 are bonded (welded) to each other.

Modification of Third Embodiment

A modification of the third embodiment of the present invention is now described with reference to FIGS. 14 and 15. In a negative-electrode terminal 508 according to this modification of the third embodiment, an upper portion of a protrusion portion 487 on a Z1 side is partially removed, unlike in the aforementioned third embodiment. The negative-electrode terminal 508 is an example of the "battery terminal" in the present invention.

Figure 14:
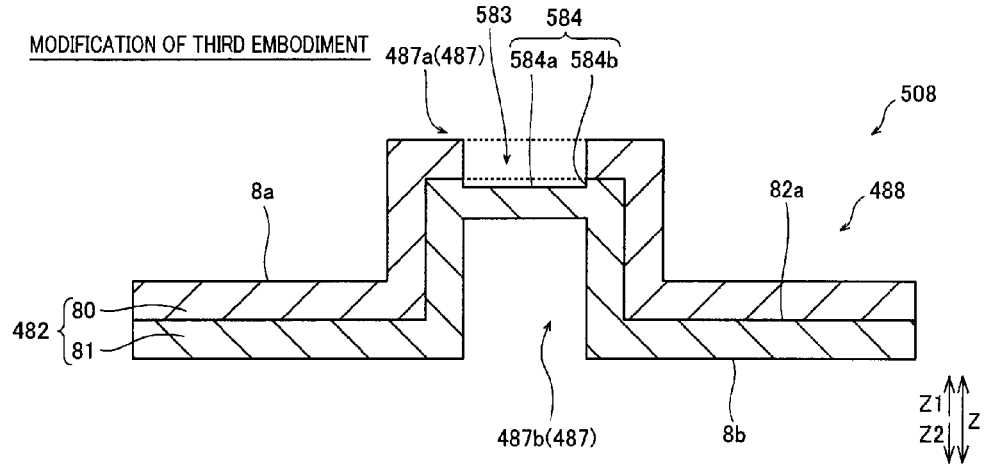
FIG. 14 is a sectional view showing a negative-electrode terminal according to a modification of the third embodiment of the present invention.
Figure 15:
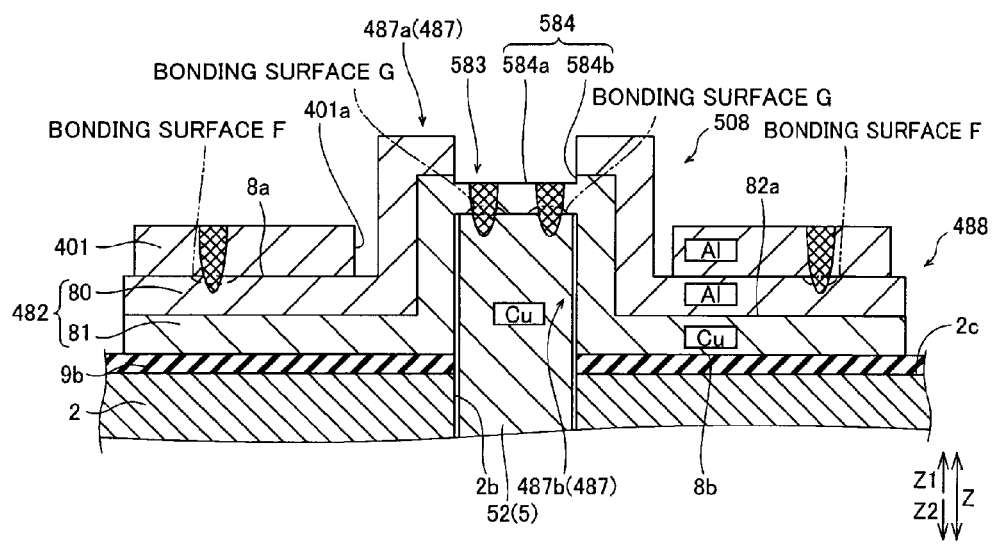
FIG. 15 is a sectional view showing a state where the negative-electrode terminal according to the modification of the third embodiment of the present invention is bonded to a negative-electrode portion and a bus bar.

As shown in FIGS. 14 and 15, an unshown end mill partially removes (cuts) the upper portion of the protrusion portion 487 on the Z1 side from the Z1 side, whereby a recess portion 583 is formed on a surface 8a of the Z1 side to which the protrusion portion 487 according to the modification of the third embodiment of the present invention protrudes. A Cu layer 81 is exposed on a bottom surface 584a and exposure side surfaces 584b of the recess portion 583, and an exposure surface 584 constituted by the bottom surface 584a and the exposure side surfaces 584b is formed in a concave shape. The height position of the exposed bottom surface 584a in a direction Z is lower (Z2 side) than the height position of an interface 82a of a clad plate material 482 in the protrusion portion 487.

According to the modification of the third embodiment, the protrusion portion 487 is formed after the recess portion 583 is formed in the clad plate material 482 in the form of a flat shape. Thus, the recess portion 583 can be formed in a state where the clad plate material 482 is in the form of a flat shape, and hence the negative-electrode terminal 508 can be easily formed as compared with the aforementioned third embodiment in which the cut surface 484 is formed in a state where the clad plate material 482 is no more in the form of a flat plate by forming the protrusion portion 487 in advance.

An upper end of a negative-electrode columnar portion 52 made of Cu inserted into a concave portion 487*b* is bonded (welded) to bonding surfaces G formed on a surface 8*b* (Cu layer 81) of the concave portion 487*b* of the protrusion portion 487 in a region corresponding to the exposure surface 584 (on a side opposite to the bottom surface 584*a*) by laser welding. The bonding surfaces G are examples of the "second bonding surface" in the present invention.

The remaining structure and effects of the modification of the third embodiment are similar to those of the aforementioned third embodiment.

Fourth Embodiment

A fourth embodiment of the present invention is now described with reference to FIGS. 16 to 18. In a negative-electrode terminal 608 according to this fourth embodiment, a through-hole 689 passing through the negative-electrode terminal 608 is formed in an exposure surface 684*a* in addition to the aforementioned third embodiment. The negative-electrode terminal 608 is an example of the "battery terminal" in the present invention.

Figure 16:
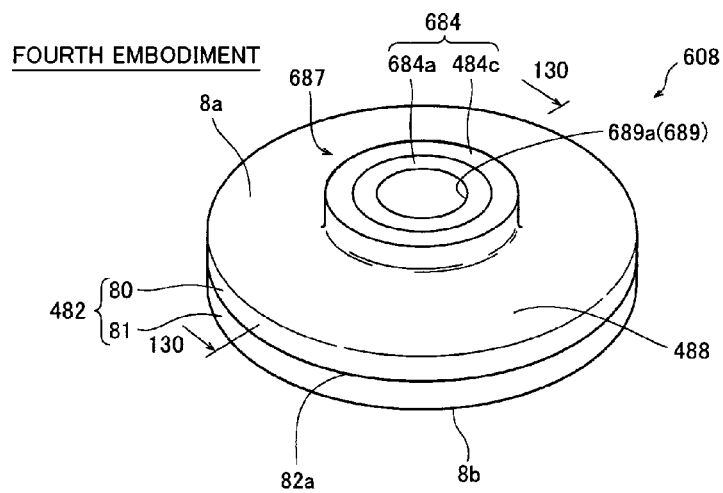
FIG. 16 is a perspective view showing a negative-electrode terminal according to a fourth embodiment of the present invention.
Figure 17:
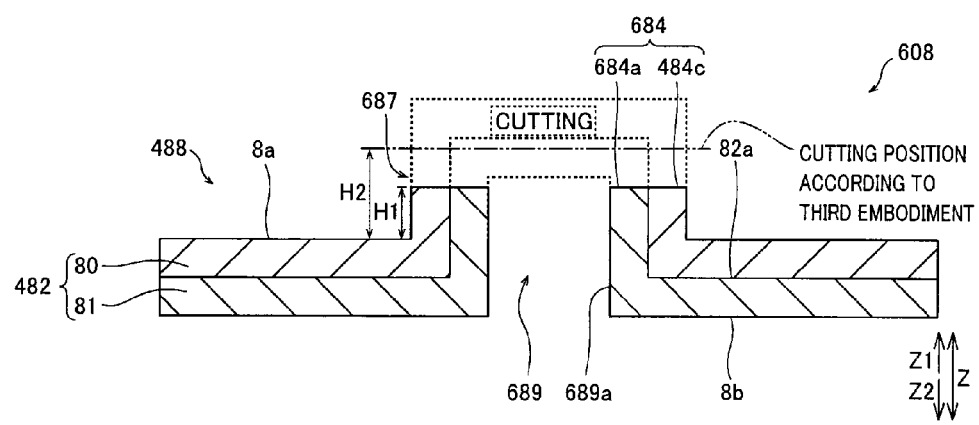
FIG. 17 is a sectional view of the negative-electrode terminal taken along the line 130-130 in FIG. 16.

In an overlay clad plate material 482 constituting the negative-electrode terminal 608 according to the fourth embodiment of the present invention, the through-hole 689 passing through the negative-electrode terminal 608 is formed in the exposure surface 684*a*, on which a Cu layer 81 is exposed, of a cut surface 684 formed on a protrusion portion 687, as shown in FIGS. 16 and 17. Specifically, the through-hole 689 is formed to extend in a direction Z from the exposure surface 684*a* to a surface 8*b* on a Z2 side corresponding to the protrusion portion 687 and is formed in a substantially central portion of the exposure surface 684*a*. Consequently, the exposure surface 684*a* is formed in a ring shape inside a ring-shaped cross-sectional surface 484*c* in a plan view.

The cut surface 684 according to the fourth embodiment is cut to a position lower (Z2 side) than a cutting position according to the aforementioned third embodiment. Consequently, the height H1 of the protrusion portion 687 in the thickness direction (direction Z) is smaller than the height H2 of the protrusion portion 487 (see FIG. 12) according to the aforementioned third embodiment.

Figure 18:
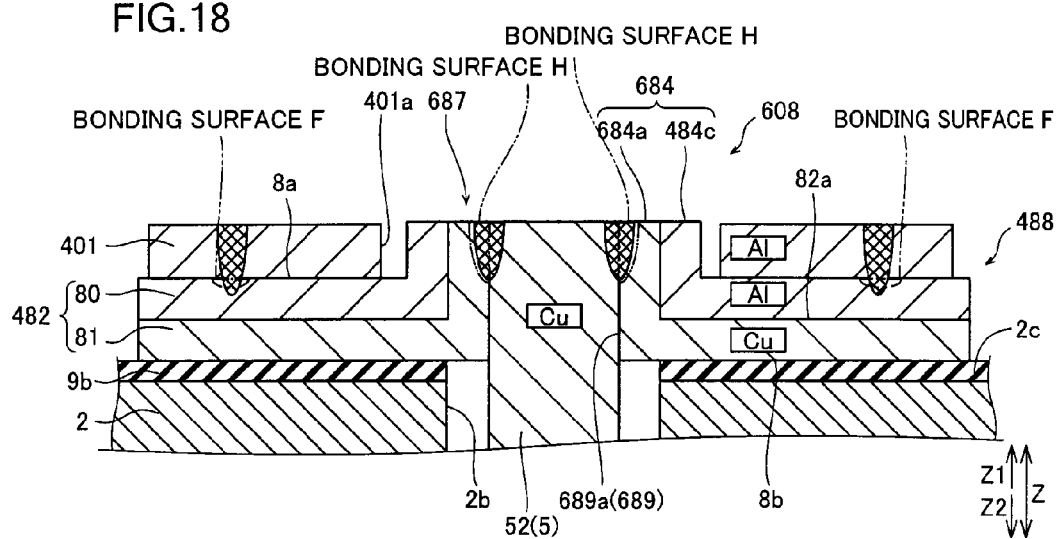
FIG. 18 is a sectional view showing a state where the negative-electrode terminal according to the fourth embodiment of the present invention is bonded to a negative-electrode portion and a bus bar.

As shown in FIG. 18, a negative-electrode columnar portion 52 made of Cu is inserted into the through-hole 689 from below (Z2 side). An upper end of the negative-electrode columnar portion 52 is exposed on a Z1 side in a state where the negative-electrode columnar portion 52 is inserted into the through-hole 689. An upper portion of the negative-electrode columnar portion 52 made of Cu is bonded (welded) to bonding surfaces H formed on the exposure surface 684*a* in the circumference of the through-hole 689 and an inner peripheral surface 689*a* (Cu layer 81) of the through-hole 689 by laser welding. These bonding surfaces H and the upper portion of the negative-electrode columnar portion 52 are bonded to each other by circumferentially emitting (scanning) a laser beam downward (along arrow Z2) along the circumference of the through-hole 689. The bonding surfaces H are examples of the "second bonding surface" in the present invention. The remaining structure of the fourth embodiment is similar to that of the aforementioned third embodiment.

According to the fourth embodiment, the following effects can be obtained.

According to the fourth embodiment, as hereinabove described, the clad plate material 482 constituting the negative-electrode terminal 608 is made of the so-called overlay clad plate material 482 in which an Al layer 80 and the Cu layer 81 are bonded to each other in the thickness direction in a state where the Al layer 80 is arranged on an entire surface 8*a* and the Cu layer 81 is arranged on the entire surface 8*b*, whereby similarly to the aforementioned first embodiment, the negative-electrode terminal 608 can be easily prepared from the overlay clad plate material 482, the mass productivity of the negative-electrode terminal 608 can be improved, and a bus bar 401 and a negative-electrode portion 5 that are made of different metal materials can be easily electrically connected to each other. Furthermore, the Cu layer 81 arranged on the surface 8*b* is exposed on the exposure surface 684*a* of the surface 8*a*, whereby formation of a fragile intermetallic compound (Al—Cu alloy) on an interface 82*a* can be suppressed, similarly to the aforementioned first embodiment.

According to the fourth embodiment, the through-hole 689 is formed in the exposure surface 684*a* formed on the protrusion portion 687, and the upper portion of the negative-electrode columnar portion 52 made of Cu is bonded on the bonding surfaces H formed on the exposure surface 684*a* in the circumference of the through-hole 689 and the inner peripheral surface 689*a* (Cu layer 81) of the through-hole 689, whereby the bonding surfaces H and the negative-electrode columnar portion 52 inserted into the through-hole 689 can be easily bonded to each other.

According to the fourth embodiment, the height H1 of the protrusion portion 687 in the thickness direction (direction Z) is rendered smaller than the height H2 of the protrusion portion 487 according to the aforementioned third embodiment, whereby an increase in the sizes of a lithium ion battery and an assembled battery in the thickness direction can be effectively suppressed. The remaining effects of the fourth embodiment are similar to those of the aforementioned third embodiment.

Modification of Fourth Embodiment

A modification of the fourth embodiment of the present invention is now described with reference to FIG. 19. In a negative-electrode terminal 708 according to the modification of this fourth embodiment, a through-hole 789 passing through the negative-electrode terminal 708 is formed in a bottom surface 784*a* in addition to the aforementioned modification of the third embodiment. The negative-electrode terminal 708 is an example of the "battery terminal" in the present invention.

Figure 19:
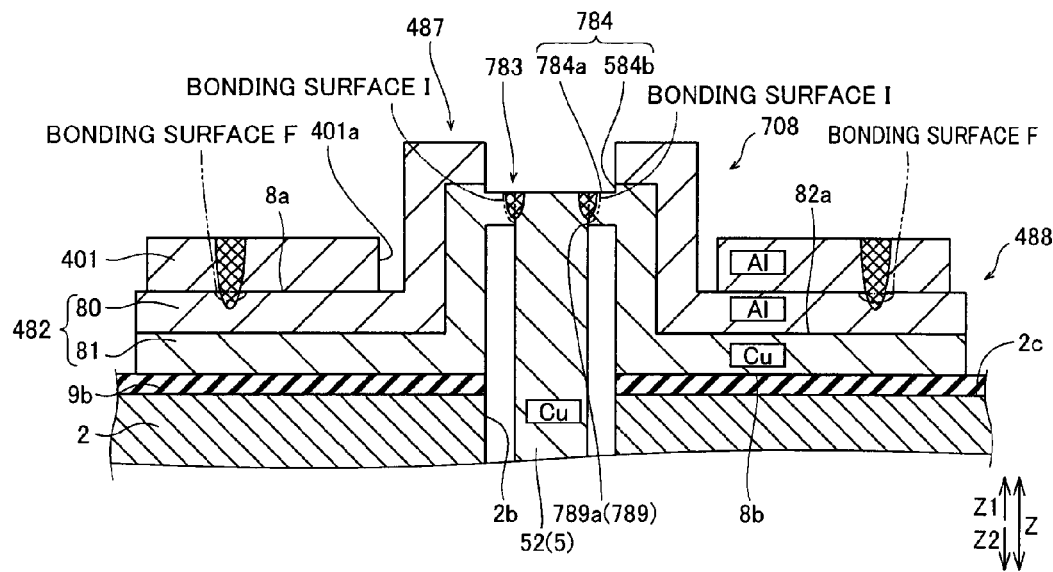
FIG. 19 is a sectional view showing a state where a negative-electrode terminal according to a modification of the fourth embodiment of the present invention is bonded to a negative-electrode portion and a bus bar.

In an overlay clad plate material 482 constituting the negative-electrode terminal 708 according to the modification of the fourth embodiment of the present invention, the through-hole 789 passing through the negative-electrode terminal 708 is formed in the bottom surface 784*a* of an exposure surface 784 formed on a protrusion portion 487, as shown in FIG. 19. Specifically, the through-hole 789 is formed to extend in a direction Z from the bottom surface 784*a* to a surface 8*b* of the protrusion portion 487 on a Z2 side and is formed in a substantially central portion of the bottom surface 784*a*. Consequently, the bottom surface 784*a* is formed in a ring shape in a recess portion 783 in a plan view.

A negative-electrode columnar portion 52 made of Cu is inserted into the through-hole 789 from below (Z2 side). An upper portion of the negative-electrode columnar portion 52 made of Cu is bonded (welded) to bonding surfaces I formed on the bottom surface 784*a* in the circumference of the through-hole 789 and an inner peripheral surface 789*a* (Cu layer 81) of the through-hole 789 by laser welding. The bonding surfaces I are examples of the "second bonding surface" in the present invention.

The remaining structure and effects of the modification of the fourth embodiment are similar to those of the aforementioned fourth embodiment.

Fifth Embodiment

A fifth embodiment of the present invention is now described with reference to FIGS. 20 and 21. In a negative-electrode terminal 808 according to this fifth embodiment, a protrusion portion 887 is formed by cold forging, unlike the protrusion portion 487 formed by pressing according to the aforementioned third embodiment. The negative-electrode terminal 808 is an example of the "battery terminal" in the present invention.

Figure 20:
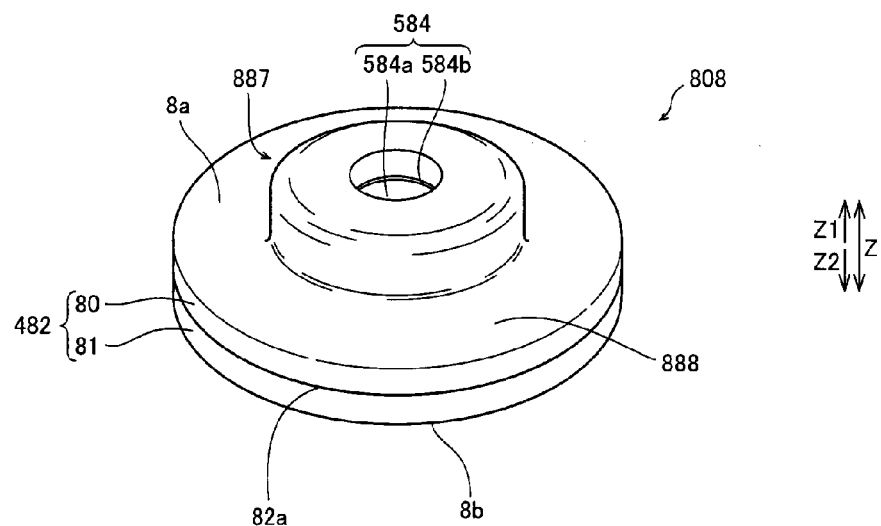
FIG. 20 is a perspective view showing a negative-electrode terminal according to a fifth embodiment of the present invention.
Figure 21:
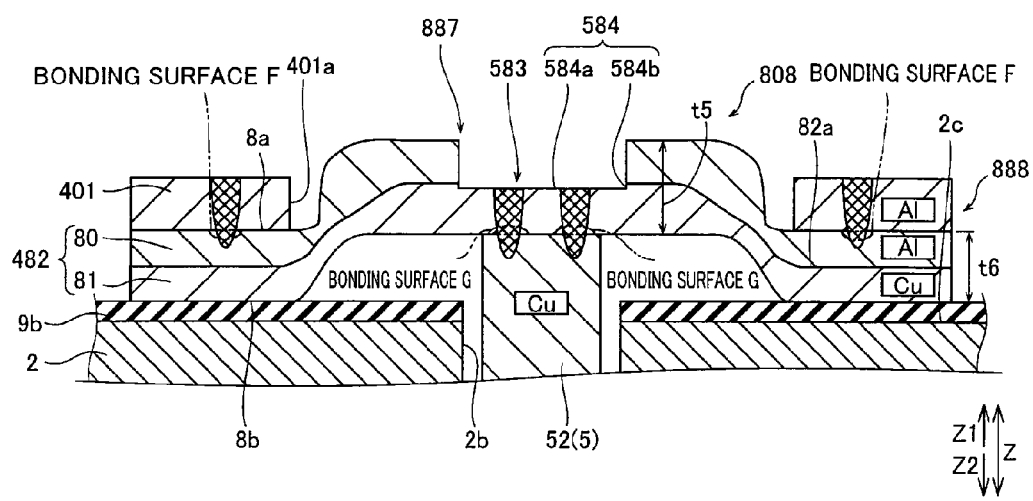
FIG. 21 is a sectional view showing a state where the negative-electrode terminal according to the fifth embodiment of the present invention is bonded to a negative-electrode portion and a bus bar.

In an overlay clad plate material 482 constituting the negative-electrode terminal 808 according to the fifth embodiment of the present invention, the protrusion portion 887 and a flange 888 are formed by cold forging, as shown in FIGS. 20 and 21. Specifically, the protrusion portion 887 and the flange 888 are formed in the clad plate material 482 by applying large pushing pressure (forging press) to a central portion of the clad plate material 482 in the form of a disc and in the form of a flat plate from a Z1 side to a Z2 side. At this time, the volume is transferred in the clad plate material 482 by cold forging, whereby the thickness (length) t5 of the protrusion portion 887 in the thickness direction (direction Z) becomes larger than the thickness (length) t6 of the flange 888 in the direction Z. The remaining structure of the fifth embodiment is similar to that of the aforementioned modification of the third embodiment.

According to the fifth embodiment, the following effects can be obtained.

According to the fifth embodiment, as hereinabove described, the clad plate material 482 constituting the negative-electrode terminal 808 is made of the so-called overlay clad plate material 482 in which an Al layer 80 and a Cu layer 81 are bonded to each other in the thickness direction in a state where the Al layer 80 is arranged on an entire surface 8a and the Cu layer 81 is arranged on an entire surface 8b, whereby similarly to the aforementioned first embodiment, the negative-electrode terminal 808 can be easily prepared from the overlay clad plate material 482, the mass productivity of the negative-electrode terminal 808 can be improved, and a bus bar 401 and a negative-electrode portion 5 that are made of different metal materials can be easily electrically connected to each other. Furthermore, the Cu layer 81 arranged on the surface 8b is exposed on an exposure surface 584 of the surface 8a, whereby formation of a fragile intermetallic compound (Al—Cu alloy) on an interface 82a can be suppressed, similarly to the aforementioned first embodiment.

According to the fifth embodiment, the protrusion portion 887 and the flange 888 are formed by cold forging, whereby work hardening is generated in the clad plate material 482 during the cold forging, and hence the mechanical strength of the negative-electrode terminal 808 can be improved as compared with the case of sheet-metal pressing in which sheet metal is pressed while the same is extended. Furthermore, in the case of the cold forging, the volume (thickness) of the clad plate material 482 can be varied depending on a position unlike the case of the sheet-metal pressing, and hence the thickness t5 of the protrusion portion 887 can be increased even when the clad plate material 482 having a small thickness is employed. Thus, the negative-electrode terminal 808 can be reduced in weight while the thickness t5 of the protrusion portion 887 is increased. In addition, in the case of the cold forging, the dimension accuracy of the negative-electrode terminal 808 can be improved as compared with the case of hot forging in which forging is performed under a high temperature condition of at least a recrystallization temperature.

According to the fifth embodiment, the thickness t5 of the protrusion portion 887 in the thickness direction (direction Z) is rendered larger than the thickness (length) t6 of the flange 888 in the direction Z, whereby in the protrusion portion 887 whose thickness t5 is large, heat of bonding the Al layer 80 and the bus bar 401 to each other and heat of bonding the negative-electrode columnar portion 52 to the Cu layer 81 (portion formed with the exposure surface 584) can be effectively inhibited from reaching the interface 82a between the Al layer 80 and the Cu layer 81 distanced from the exposure surface 584, and hence formation of a fragile intermetallic compound (Al—Cu alloy) on the interface 82a between the Al layer 80 and the Cu layer 81 resulting from the heat can be effectively suppressed. The remaining effects of the fifth embodiment are similar to those of the aforementioned first embodiment.

Modification of Fifth Embodiment

A modification of a fifth embodiment of the present invention is now described with reference to FIG. 22. In a negative-electrode terminal 908 according to this modification of the fifth embodiment, a through-hole 989 is formed in a bottom surface 584a of an exposure surface 584 in addition to the aforementioned fifth embodiment. The negative-electrode terminal 908 is an example of the "battery terminal" in the present invention.

Figure 22:
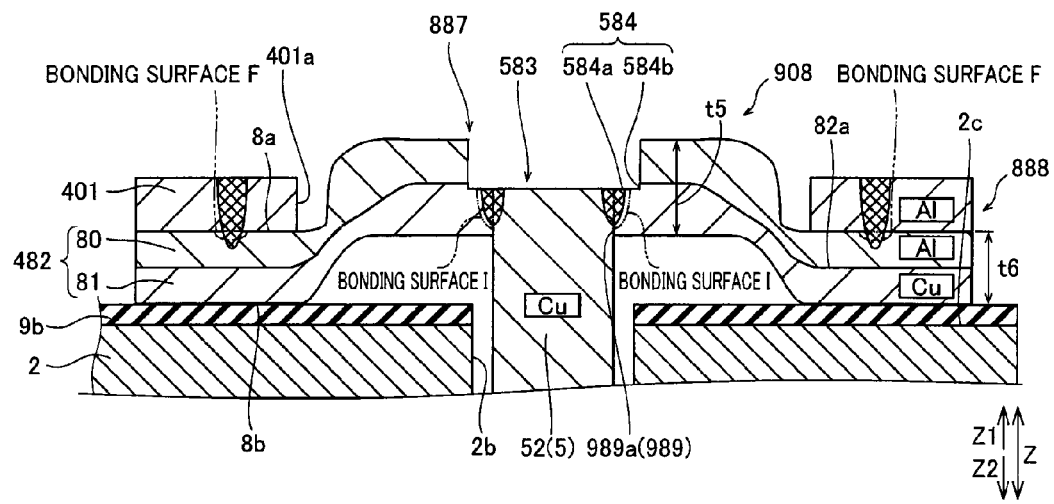
FIG. 22 is a sectional view showing a state where a negative-electrode terminal according to a modification of the fifth embodiment of the present invention is bonded to a negative-electrode portion and a bus bar.

In an overlay clad plate material 482 constituting the negative-electrode terminal 908 according to the modification of the fifth embodiment of the present invention, the through-hole 989 passing through the negative-electrode terminal 908 is formed in the bottom surface 584a of a recess portion 583 formed in a protrusion portion 887, as shown in FIG. 22. Specifically, the through-hole 989 is formed to extend in a direction Z from the bottom surface 584a to a surface 8b of the protrusion portion 887 on a Z2 side and is formed in a substantially central portion of the bottom surface 584a. This through-hole 989 may be formed in the protrusion portion 887 before the recess portion 583 is formed or may be formed in the bottom surface 584a after the recess portion 583 is formed.

An upper portion of a negative-electrode columnar portion 52 made of Cu is bonded (welded) to bonding surfaces I formed on the bottom surface 584a in the circumference of the through-hole 989 and inner peripheral surface 989a (Cu layer 81) of the through-hole 989 by laser welding.

The remaining structure and effects of the modification of the fifth embodiment are similar to those of the aforementioned fifth embodiment.

Sixth Embodiment

A sixth embodiment of the present invention is now described with reference to FIGS. 23 and 24. In this six embodiment, a negative-electrode terminal 1008 is made of a three-layered clad plate material 1082, unlike the negative-electrode terminal 8 according to the aforementioned first embodiment made of the two-layered clad plate material 82. The negative-electrode terminal 1008 is an example of the "battery terminal" in the present invention.

Figure 23:
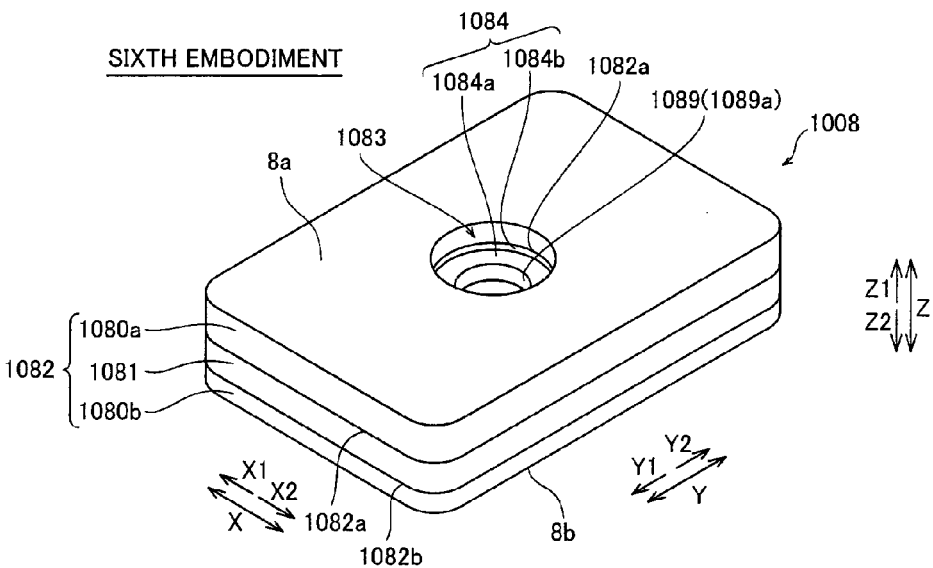
FIG. 23 is a perspective view showing a negative-electrode terminal according to a sixth embodiment of the present invention.
Figure 24:
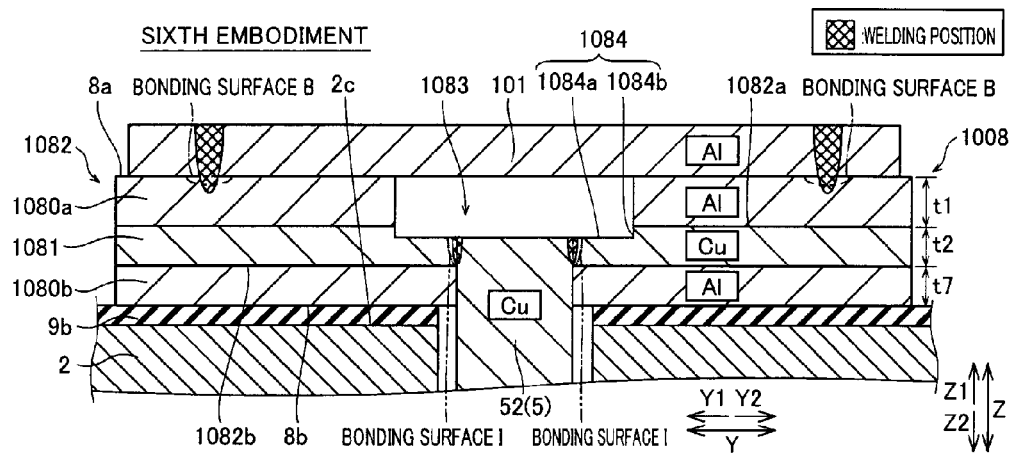
FIG. 24 is a sectional view showing a state where the negative-electrode terminal according to the sixth embodiment of the present invention is bonded to a negative-electrode portion and a bus bar.

The negative-electrode terminal 1008 according to the sixth embodiment of the present invention is made of the three-layered clad plate material 1082 in which an Al layer 1080a made of Al, a Cu layer 1081 made of Cu, and an Al layer 1080b made of Al that is the same metal material as that of the Al layer 1080a are bonded to each other in this order in the thickness direction (direction Z) from a surface 8a on a Z1 side to a surface 8b on a Z2 side, as shown in FIGS. 23 and 24. In this clad plate material 1082, the Al layer 1080a is stacked on the substantially entire upper surface (Z1 side) (excluding a bottom surface 1084a described later) of the Cu layer 1081, and the Al layer 1080b is stacked on the substantially entire lower surface (Z2 side) of the Cu layer 1081. In other words, the clad plate material 1082 is a so-called overlay clad plate material 1082. The Al layer 1080a is arranged on the surface 8a of the negative-electrode terminal 1008 on the Z1 side, and the Al layer 1080b is arranged on the surface 8b of the negative-electrode terminal 1008 on the Z2 side. The Al layer 1080b is arranged to hold the Cu layer 1081 between the Al layer 1080b and the Al layer 1080a in the direction Z. The Al layer 1080a is an example of "either the first metal layer or the second metal layer" in the present invention. The Cu layer 1081 is an example of "either the second metal layer or the first metal layer" in the present invention. The Al layer 1080b is an example of the "third metal layer" in the present invention.

As shown in FIG. 24, the thickness t1 of the Al layer 1080a is larger than the thickness t7 of the Al layer 1080b, the thickness t1 of the Al layer 1080a in the direction Z is about 1.5 mm, and the thickness t2 of the Cu layer 1081 in the direction Z and the thickness t7 of the Al layer 1080b in the direction Z both are about 1 mm.

A concave portion 1083 concave to the Z2 side is formed on the surface 8a on the Z1 side in the clad plate material 1082 constituting the negative-electrode terminal 1008. This concave portion 1083 is substantially circularly formed in a plan view, as shown in FIG. 23. The concave portion 1083 is formed by partially removing (cutting) an upper portion of the Al layer 1080a arranged on the Z1 side and an upper portion of the Cu layer 1081 on the Z1 side from the Z1 side. Thus, the Cu layer 1081 is exposed on the bottom surface 1084a of the concave portion 1083 and a lower portion (exposure side surface 1084b) of the side surface of the concave portion 1083. An exposure surface 1084 constituted by these bottom surface 1084a and exposure side surface 1084b is formed in a concave shape concave to a side (Z2 side) closer to the surface 8b beyond an interface 1082a between the Al layer 1080a and the Cu layer 1081 of the clad plate material 1082.

The lower surface of a bus bar 101 in the form of a flat plate made of Al is bonded (welded) to bonding surfaces B formed on the surface 8a (Al layer 1080a) by laser welding. The negative-electrode terminal 1008 is formed with a through-hole 1089 passing through the negative-electrode terminal 1008. Specifically, the through-hole 1089 is formed in a substantially central portion of the bottom surface 1084a of the concave portion 1083 and is formed to extend in the direction Z from the bottom surface 1084a of the concave portion 1083 to the surface 8b of the clad plate material 1082 on the Z2 side. In other words, the through-hole 1089 is formed by partially removing the Cu layer 1081 and the Al layer 1080b arranged on the Z2 side in a region corresponding to the concave portion 1083. On an inner peripheral surface 1089a of the through-hole 1089, the Cu layer 1081 is exposed. The inner peripheral surface 1089a is an example of the "reverse side exposure surface" in the present invention.

A negative-electrode columnar portion 52 made of Cu is inserted into the through-hole 1089 from below (Z2 side). An upper portion of the negative-electrode columnar portion 52 made of Cu is bonded (welded) to bonding surfaces I formed on the bottom surface 1084a in the circumference of the through-hole 1089 and the inner peripheral surface 1089a (Cu layer 1081) of the through-hole 1089 by laser welding. The remaining structure of the sixth embodiment is similar to that of the aforementioned first embodiment.

According to the sixth embodiment, the following effects can be obtained.

According to the sixth embodiment, as hereinabove described, the clad plate material 1082 constituting the negative-electrode terminal 1008 is made of the so-called overlay clad plate material 1082 in which the Al layer 1080a, the Cu layer 1081, and the Al layer 1080b are bonded to each other in the thickness direction in a state where the Al layer 1080a is stacked on the substantially entire upper surface (Z1 side) of the Cu layer 1081 and the Al layer 1080b is stacked on the substantially entire lower surface (Z2 side) of the Cu layer 1081. Thus, similarly to the aforementioned first embodiment, the negative-electrode terminal 1008 can be easily prepared from the overlay clad plate material 1082, the mass productivity of the negative-electrode terminal 1008 can be improved, and the bus bar 101 and a negative-electrode portion 5 that are made of different metal materials can be easily electrically connected to each other. Furthermore, the Cu layer 1081 arranged on the surface 8b is exposed on the exposure surface 1084 of the surface 8a, whereby formation of a fragile intermetallic compound (Al—Cu alloy) on the interface 1082a between the Al layer 1080a and the Cu layer 1081 can be suppressed, similarly to the aforementioned first embodiment.

According to the sixth embodiment, the Al layer 1080b made of Al that is the same metal material as that of the Al layer 1080a is arranged to hold the Cu layer 1081 between the Al layer 1080b and the Al layer 1080a in the direction Z, and the inner peripheral surface 1089a on which the Cu layer 1081 is exposed is formed in the clad plate material 1082 by partially removing the Cu layer 1081 and the Al layer 1080b in the region corresponding to the concave portion 1083. According to this structure, even in the case where the Al layer 1080a and the Al layer 1080b are arranged on both sides of the Cu layer 1081 to hold the Cu layer 1081 therebetween, the exposure surface 1084 and the inner peripheral surface 1089a corresponding to the exposure surface 1084 are formed in the clad plate material 1082, whereby there is no interface 1082a between the Al layer 1080a and the Cu layer 1081 or interface 1082b between the Cu layer 1081 and the Al layer 1080b in a region where the exposure surface 1084 and the inner peripheral surface 1089a are formed (region corresponding to the concave portion 1083). Thus, heat of bonding can be inhibited from reaching the interfaces 1082a and 1082b distanced from the exposure surface 1084, and hence formation of a fragile intermetallic compound (Al—Cu alloy) on the interfaces 1082a and 1082b resulting from the heat can be suppressed. Thus, a reduction in the bond strength of the clad plate material 1082 can be reliably suppressed.

According to the sixth embodiment, the Al layer 1080b bonded on the Cu layer 1081 is provided in the clad plate material 1082 to hold the Cu layer 1081 between the Al layer 1080b and the Al layer 1080a, whereby an area on which the Cu layer 1081 made of Cu inferior in corrosion resistance is exposed can be sufficiently reduced, and hence corrosion of the negative-electrode terminal 1008 can be suppressed.

According to the sixth embodiment, even in the case where the clad plate material is formed by rolling, the negative-electrode terminal 1008 is made of the three-layered clad plate material 1082, whereby the clad plate material 1082 can be easily formed in a thickness of at least 3 mm as compared with the case where the two-layered clad plate material is employed. In other words, although the thickness of each of the metal layers constituting the clad plate material is reduced by rolling in bonding, the thickness of the entire clad plate material can be easily increased by an amount equal to the number of layers by providing three or more metal layers. Thus, the mechanical strength of the negative-electrode terminal 1008 can be improved.

According to the sixth embodiment, the thickness t1 of the Al layer 1080a including the bonding surfaces B bonded to the bus bar 101 is rendered larger than the thickness t7 of the Al layer 1080b, whereby it can be made difficult for the heat to reach the interface 1082a between the Al layer 1080a and the Cu layer 1081 when the bus bar 101 and the Al layer 1080a are bonded to each other. Thus, the formation of the fragile intermetallic compound (Al—Cu alloy) on the interface 1082a can be effectively suppressed. The remaining effects of the sixth embodiment are similar to those of the aforementioned first embodiment.

First Modification of Sixth Embodiment

A first modification of the sixth embodiment of the present invention is now described with reference to FIG. 25. According to this first modification of the sixth embodiment, instead of the concave portion 1083 according to the aforementioned sixth embodiment, a groove 1183 is formed.

Figure 25:
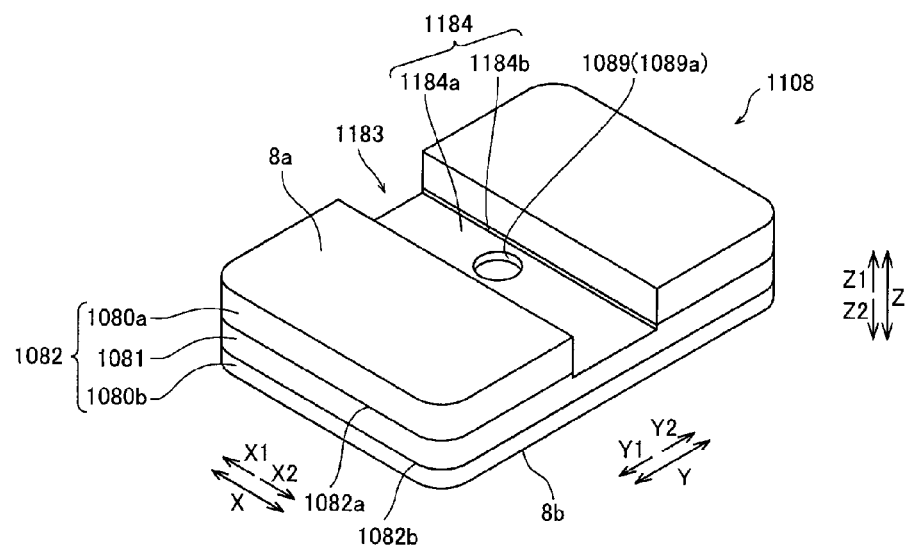
FIG. 25 is a perspective view showing a negative-electrode terminal according to a first modification of the sixth embodiment of the present invention.

A negative-electrode terminal 1108 according to the first modification of the sixth embodiment of the present invention is made of a three-layered clad plate material 1082 in which an Al layer 1080a, a Cu layer 1081, and an Al layer 1080b are bonded to each other, as shown in FIG. 25. The negative-electrode terminal 1108 is an example of the "battery terminal" in the present invention.

In the clad plate material 1082 constituting the negative-electrode terminal 1108, the groove 1183 concave to a Z2 side is formed in a surface 8a on a Z1 side. This groove 1183 is formed to extend in the short-side (direction X) of the negative-electrode terminal 1108 with a constant width in the longitudinal direction (direction Y) of the negative-electrode terminal 1108. In a plan view, the groove 1183 is formed in a substantially central portion of the negative-electrode terminal 1108 in the direction Y. The groove 1183 is formed by partially removing (cutting) the Al layer 1080a and an upper portion of the Cu layer 1081 on the Z1 side from the Z1 side. The Cu layer 1081 is exposed on a bottom surface 1184a of the groove 1183 and lower portions (exposure side surfaces 1184b) of side surfaces of the groove 1183. This exposure surface 1184 constituted by the bottom surface 1184a and the exposure side surfaces 1184b is formed in a concave shape concave to a side (Z2 side) closer to a surface 8b beyond an interface 1082a between the Al layer 1080a and the Cu layer 1081 of the clad plate material 1082.

According to the first modification of the sixth embodiment, the groove 1183 is formed, whereby a plurality of negative-electrode terminals 1108 can be easily mass-produced as compared with the case where the concave portion 1083 according to the aforementioned sixth embodiment is formed. In other words, the rolled clad plate material 1082 is cut after the groove 1183 having a prescribed depth (length in the thickness direction (direction Z)) is continuously formed in the rolled clad plate material 1082, whereby the plurality of negative-electrode terminals 1108 each formed with the groove 1183 can be prepared, and hence the plurality of negative-electrode terminals 1108 can be easily mass-produced as compared with the aforementioned sixth embodiment in which the depth position of the concave portion 1083 is required to be adjusted each time the concave portion 1083 is prepared.

The through-hole 1089 is formed in a substantially central portion of the bottom surface 1184a of the groove 1183 and is formed to extend in the direction Z from the bottom surface 1184a of the groove 1183 to the surface 8b of the clad plate material 1082 on the Z2 side. The remaining structure and effects of the first modification of the sixth embodiment are similar to those of the aforementioned sixth embodiment.

Second Modification of Sixth Embodiment

A second modification of a sixth embodiment of the present invention is now described with reference to FIGS. 26 and 27. In this second modification of the sixth embodiment, instead of the through-hole 1089 according to the first modification of the aforementioned sixth embodiment, a groove 1289 is formed.

Figure 26:
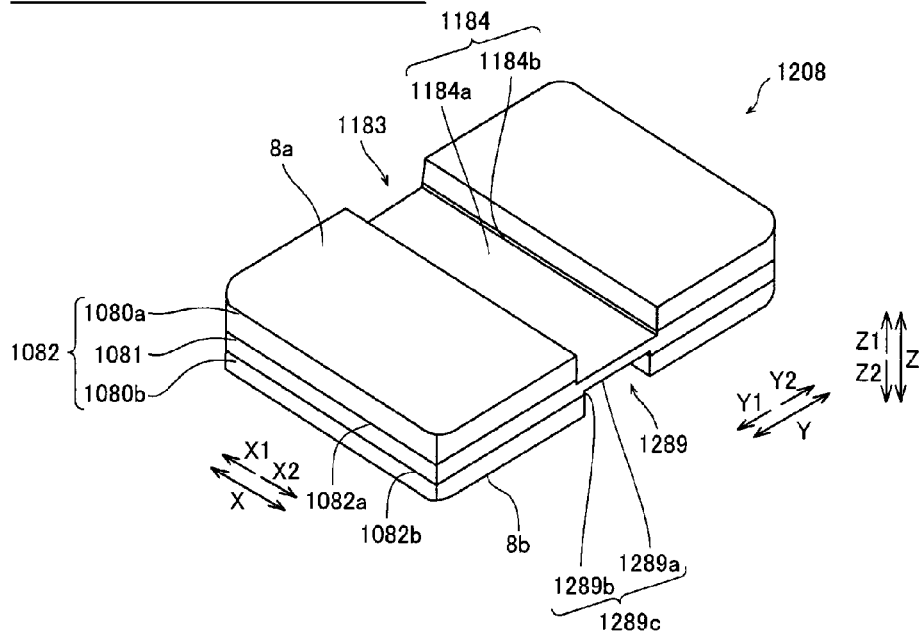
FIG. 26 is a perspective view showing a negative-electrode terminal according to a second modification of the sixth embodiment of the present invention.
Figure 27:
FIG. 27 is a sectional view showing a state where the negative-electrode terminal according to the second modification of the sixth embodiment of the present invention is bonded to a negative-electrode portion and a bus bar.
Figure 27:
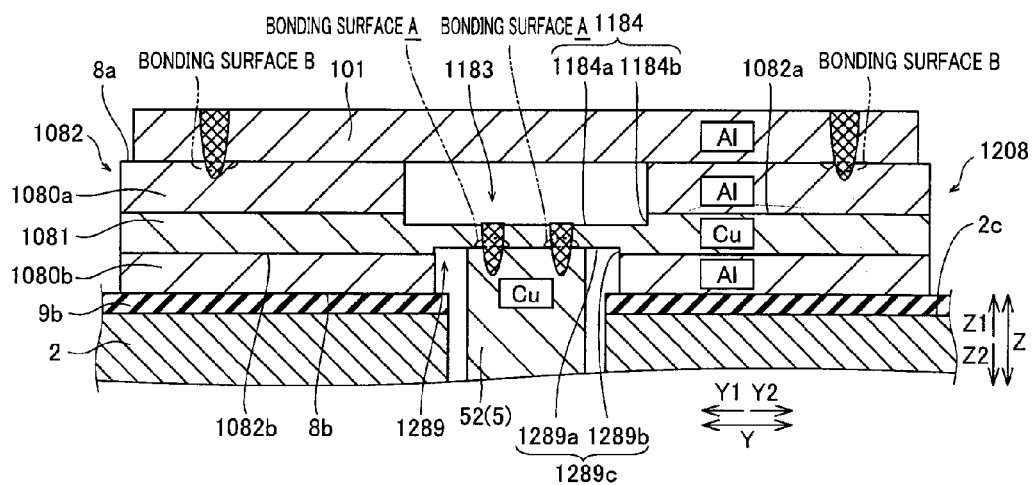

In a clad plate material 1082 of a negative-electrode terminal 1208 according to the second modification of the sixth embodiment of the present invention, a groove 1183 concave to a Z2 side is formed on a surface 8a on a Z1 side, and the groove 1289 concave to the Z1 side is formed on a surface 8b on the Z2 side, as shown in FIGS. 26 and 27. This groove 1289 is formed at a position corresponding to the groove 1183 in a plan view. The groove 1289 is formed to extend in the short-side direction (direction X) of the negative-electrode terminal 1208 with a constant width in the longitudinal direction (direction Y) of the negative-electrode terminal 1208. The groove 1289 is formed by partially removing (cutting) an Al layer 1080b and a lower portion of a Cu layer 1081 on the Z2 side from the Z2 side. The Cu layer 1081 is exposed on a bottom surface 1289a of the groove 1289 and lower portions (exposure side surfaces 1289b) of side surfaces of the groove 1289. A reverse side exposure surface 1289c constituted by these bottom surface 1289a and exposure side surfaces 1289b is formed in a concave shape concave to a side (Z1 side) closer to the surface 8a beyond an interface 1082b between the Al layer 1080b and the Cu layer 1081 of the clad plate material 1082. The negative-electrode terminal 1208 is an example of the "battery terminal" in the present invention.

According to the second modification of the sixth embodiment, the grooves 1183 and 1289 are formed in both sides (surfaces 8a and 8b) of the clad plate material 1082, whereby the front and back surfaces of the negative-electrode terminal 1208 are not required to be strictly distinguished unlike the case where the groove 1183 is formed only in one surface (surface 8a) as in the first modification of the aforementioned sixth embodiment.

As shown in FIG. 27, an upper portion of a negative-electrode columnar portion 52 made of Cu is bonded (welded) to bonding surfaces A formed on the bottom surface 1289a of the reverse side exposure surface 1289c in a region corresponding to an exposure surface 1184 by laser welding. The remaining structure and effects of the second modification of the sixth embodiment are similar to those of the aforementioned sixth embodiment.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the negative-electrode terminal is employed as the "battery terminal" according to the present invention, the negative-electrode terminal and the bus bar made of Al are connected to each other, and the negative-electrode terminal and the negative-electrode columnar portion of the negative-electrode portion made of Cu are connected to each other in each of the aforementioned first to sixth embodiments, the present invention is not restricted to this. According to the present invention, the positive-electrode terminal may alternatively be employed as the "battery terminal" according to the present invention, the positive-electrode terminal and the bus bar made of Cu may alternatively be connected to each other, and the positive-electrode terminal and the positive-electrode columnar portion of the positive-electrode portion made of Al may alternatively be connected to each other. In this case, Cu and Al become inverted in each of the aforementioned first to sixth embodiments. In the aforementioned first embodiment, for example, a positive-electrode columnar portion made of Al and an Al layer arranged on a surface 8*b* of a positive-electrode terminal (battery terminal) are bonded to each other, and a bus bar made of Cu and a Cu layer arranged on a surface 8*a* of the positive-electrode terminal are bonded to each other. In this case, the Cu layer arranged on the surface 8*a* is an example of "either the first metal layer or the second metal layer" in the present invention, and the Al layer arranged on the surface 8*b* is an example of the "either the second metal layer or the first metal layer" in the present invention. In the aforementioned sixth embodiment, a positive-electrode columnar portion made of Al passing through a through-hole of a Cu layer arranged on a surface 8*b* of a positive-electrode terminal and an Al layer held between a pair of Cu layers of the positive-electrode terminal (battery terminal) are bonded to each other, and a bus bar made of Cu and a Cu layer arranged on a surface 8*a* of the positive-electrode terminal are bonded to each other. In this case, the Cu layer arranged on the surface 8*a* is an example of "either the first metal layer or the second metal layer" in the present invention, the Al layer held between the pair of Cu layers is an example of "either the second metal layer or the first metal layer" in the present invention, and the Cu layer arranged on the surface 8*b* is an example of the "third metal layer" in the present invention. In each of these cases, the bus bar made of Cu having small electric resistance can be employed, and hence power consumption in the bus bar can be suppressed. Consequently, electric loss in an assembled battery can be reduced.

While the substantially circular protrusion portion is formed on the substantially circular negative-electrode terminal in the plan view in each of the aforementioned third to fifth embodiments, the present invention is not restricted to this. According to the present invention, the negative-electrode terminal and the protrusion portion may alternatively be rectangularly formed in the plan view.

While the negative-electrode terminal and the bus bar are bonded (welded) to each other by laser welding, and the negative-electrode terminal and the current collector are bonded (welded) to each other in each of the aforementioned first to sixth embodiments, the present invention is not restricted to this. According to the present invention, the negative-electrode terminal and the bus bar or the current collector may alternatively be bonded to each other by another welding method such as resistance welding, TIG (tungsten inert gas) welding, or ultrasonic welding according to the positional relationship or the like between the negative-electrode terminal and the bus bar or the current collector. The laser welding is preferable since the welding can be easily performed at a position to which a laser can be emitted, as compared with the resistance welding or the like in which a welded terminal is required to be arranged near a welding position.

While the thickness t1 of the Al layer 80 in the direction Z and the thickness t2 of the Cu layer 81 in the direction Z are substantially equal to each other in the aforementioned first embodiment, the present invention is not restricted to this. According to the present invention, the thickness t1 of the Al layer 80 and the thickness t2 of the Cu layer 81 may alternatively be made different from each other. In the case where the thickness t1 and the thickness t2 are too small, the heat of bonding easily reaches the interface 82*a* between the Al layer 80 and the Cu layer 81. Thus, the fragile Al—Cu alloy is formed on the interface 82*a* between the Al layer 80 and the Cu layer 81, and the Al layer 80 and the Cu layer 81 are easily separated from each other. Therefore, the thicknesses t1 and t2 are preferably about at least 1 mm.

While the thickness t1 of the Al layer 1080*a* (first metal layer) including the bonding surfaces B (first bonding surface) is larger than the thickness t7 of the Al layer 1080*b* (third metal layer) in the aforementioned six embodiment, the present invention is not restricted to this. According to the present invention, the thickness of the first metal layer including the first bonding surface may alternatively be not more than the thickness of the third metal layer.

While the Al layer 1080*a* (first metal layer) including the bonding surfaces B (first bonding surface) and the Al layer 1080*b* (third metal layer) are made of the same metal material (Al) in the aforementioned sixth embodiment, the present invention is not restricted to this. According to the present invention, the first metal layer closer to the first bonding surface and the third metal layer may alternatively be made of different metal materials but the same type of metal materials (the first metal layer closer to the first bonding surface may be made of Al, and the third metal layer may be made of Al alloy, for example) or may alternatively be made of different types of metal materials.

While the Al layer is made of Al, and the Cu layer is made of Cu in each of the aforementioned first to sixth embodiments, the present invention is not restricted to this. According to the present invention, the Al layer may alternatively be made of Al alloy, or the Cu layer may alternatively be made of Cu alloy.

While the Ni layer is made of Ni in the aforementioned second embodiment, the present invention is not restricted to this. According to the present invention, the Ni layer may alternatively be made of Ni alloy.

While the Al layer and the bus bar bonded to each other are made of the same metal material (Al) and the Cu layer and the current collector bonded to each other are made of the same metal material (Cu) in each of the aforementioned first to sixth embodiments, the present invention is not restricted to this. According to the present invention, the Al layer and the bus bar bonded to each other may alternatively be made of different metal materials but the same type of metal materials such that one of the Al layer and the bus bar is made of Al and the other of the Al layer and the bus bar is made of Al alloy, for example. Similarly, the Cu layer and the current collector bonded to each other may alternatively be made of different metal materials but the same type of metal materials such that one of the Cu layer and the current collector is made of Cu and the other of the Cu layer and the current collector is made of Cu alloy, for example. The term "same type of metal material" according to the present invention is a wide concept including not only metal materials (pure metal and alloy) made of the same chemical component but also metal materials having different chemical components but the same main metal elements. Furthermore, the Cu layer and the current collector may not be made of the same metal material (Cu), but a current collector and a Cu layer made of Ni and Ni alloy or Fe and Fe alloy, for example, may be bonded to each other.

While the Cu layer 81 is not removed in the region corresponding to the "first bonding surface" (bonding surfaces B, D, and F) according to the present invention in each of the aforementioned first to fifth embodiments, the present invention is not restricted to this. According to the present invention, the Cu layer 81 in the region corresponding to the first bonding surface may alternatively be removed. In other words, the Cu layer 81 in the region corresponding to the second bonding surface (bonding surfaces A, C, E, H, and I) may be exposed on the first surface (surface 8a), and the Al layer 80 in the region corresponding to the first bonding surface may be exposed on the second surface (surface 8b).

Figure 28:
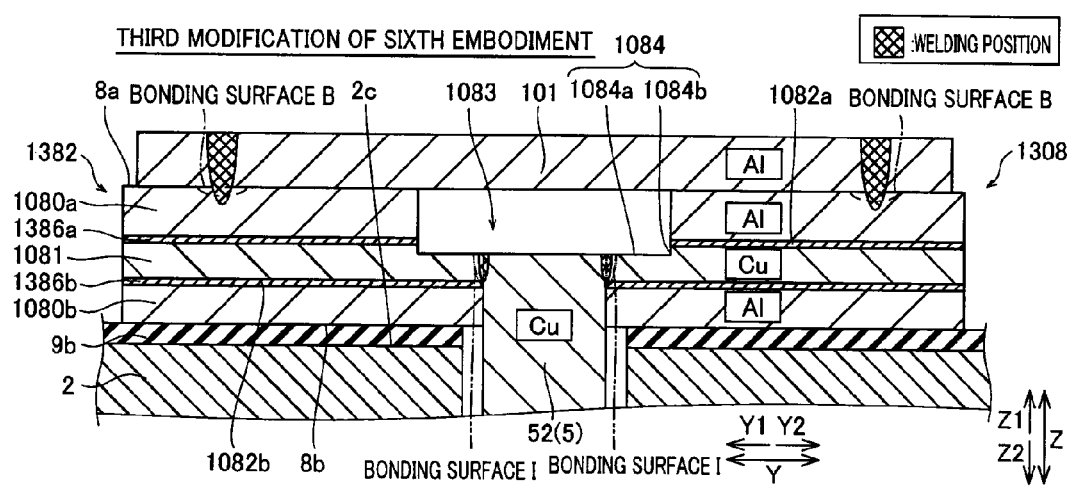
FIG. 28 is a sectional view showing a state where a negative-electrode terminal according to a third modification of the sixth embodiment of the present invention is bonded to a negative-electrode portion and a bus bar.

While the negative-electrode terminal 1008 is made of the three-layered clad plate material 1082 in the aforementioned sixth embodiment, the present invention is not restricted to this. According to the present invention, the battery terminal may alternatively be made of a four or more layered clad plate material. A negative-electrode terminal 1308 may be made of a five-layered clad plate material 1382 in which reaction suppressing layers 1386a and 1386b made of Ni or Ni alloy are provided on an interface 1082a between an Al layer 1080a and a Cu layer 1081 and an interface 1082b between the Cu layer 1081 and an Al layer 1080b, respectively, as in a third modification of the aforementioned sixth embodiment shown in FIG. 28, for example. Thus, even in the case where heat of bonding the Al layer 1080a and a bus bar 101 to each other and heat of bonding the Cu layer 1081 and a negative-electrode columnar portion 52 to each other reach the interface 1082a between the Al layer 1080a and the Cu layer 1081 and the interface 1082b between the Cu layer 1081 and the Al layer 1080b, a Ni layer 1386a made of Ni or Ni alloy can suppress reaction of the Al layer 1080a with the Cu layer 1081. Furthermore, a Ni layer 1386b made of Ni or Ni alloy can suppress reaction of the Cu layer 1081 with the Al layer 1080b. Consequently, formation of a fragile Al—Cu alloy on the interfaces 1082a and 1082b can be reliably suppressed. At this time, a reaction suppressing layer made of Ni or Ni alloy may be provided only on one of the interface 1082a between the Al layer 1080a and the Cu layer 1081 and the interface 1082b between the Cu layer 1081 and the Al layer 1080b.

While the through-hole into which the negative-electrode columnar portion is inserted is formed in the protrusion portion in the negative-electrode terminal in each of the aforementioned fourth embodiment, modification of the fourth embodiment, and modification of the fifth embodiment, the present invention is not restricted to this. According to the present invention, the through-hole into which the negative-electrode columnar portion is inserted may alternatively be provided in the recess portion or the cutout portion also as in the negative-electrode terminal in the form of a flat plate as in each of the aforementioned first embodiment, modification of the first embodiment, and second embodiment.

What is claimed is:

1. A battery terminal comprising an overlay clad plate material including at least a first metal layer made of Al or Al alloy and a second metal layer made of Cu or Cu alloy, formed by bonding at least the first metal layer and the second metal layer to each other in a thickness direction,
   wherein either the first metal layer or the second metal layer of the overlay clad plate material is partially removed to form an exposure surface on which either the second metal layer or the first metal layer is exposed,
   wherein either the first metal layer or the second metal layer includes a first bonding surface bonded to a connecting member configured to connect a battery to an external portion,
   either the second metal layer or the first metal layer includes a second bonding surface bonded to a current collector configured to connect with an electrode of the battery,
   the first bonding surface is formed in a region excluding the exposure surface of a first surface on a side formed with the exposure surface, and
   the second bonding surface is formed in a region corresponding to the exposure surface.

2. The battery terminal according to claim 1, wherein the second bonding surface is formed on a second surface opposite to the exposure surface.

3. The battery terminal according to claim 1, wherein a through-hole is formed in the exposure surface, and the second bonding surface is formed on an inner peripheral surface of the through-hole.

4. The battery terminal according to claim 1, wherein either the first metal layer or the second metal layer including the first bonding surface is made of a same type of metal material as that of the connecting member, and
   either the second metal layer or the first metal layer including the second bonding surface is made of a same type of metal material as that of the current collector.

5. The battery terminal according to claim 1, wherein the exposure surface is formed in a concave shape concave toward a second surface opposite to the exposure surface beyond an interface between the first metal layer and the second metal layer.

6. The battery terminal according to claim 1, wherein the clad plate material includes a protrusion portion protruding toward a first surface on a side formed with the exposure surface, and
   the exposure surface is formed on at least a part of the first surface toward which the protrusion portion protrudes.

7. The battery terminal according to claim 6, wherein a length of the protrusion portion in the thickness direction is larger than a length of a portion other than the protrusion portion in the thickness direction.

8. The battery terminal according to claim 1, wherein the clad plate material further includes a reaction suppressing layer made of Ni or Ni alloy on an interface between the first metal layer and the second metal layer.

9. The battery terminal according to claim 1, wherein the overlay clad plate material further includes a third metal layer bonded to either the second metal layer or the first metal layer to hold either the second metal layer or the first metal layer between the third metal layer and either the first metal layer or the second metal layer, and
   the third metal layer in a region corresponding to the exposure surface is partially removed to form a reverse side exposure surface on which either the second metal layer or the first metal layer is exposed.

10. The battery terminal according to claim 9, wherein either the first metal layer or the second metal layer includes a first bonding surface bonded to a connecting member configured to connect a battery to an external portion, and
a thickness of either the first metal layer or the second metal layer including the first bonding surface is larger than a thickness of the third metal layer.

11. A battery terminal comprising an overlay clad plate material including at least a first metal layer made of Al or Al alloy and a second metal layer made of Cu or Cu alloy, formed by bonding at least the first metal layer and the second metal layer to each other in a thickness direction,
wherein either the first metal layer or the second metal layer of the overlay clad plate material is partially removed to form an exposure surface on which either the second metal layer or the first metal layer is exposed,
wherein the overlay clad plate material further includes a third metal layer bonded to either the second metal layer or the first metal layer to hold either the second metal layer or the first metal layer between the third metal layer and either the first metal layer or the second metal layer,
the third metal layer in a region corresponding to the exposure surface is partially removed to form a reverse side exposure surface on which either the second metal layer or the first metal layer is exposed, and
wherein the third metal layer is made of a same type of metal material as that of either the first metal layer or the second metal layer.

12. A battery terminal comprising an overlay clad plate material including at least a first metal layer made of Al or Al alloy and a second metal layer made of Cu or Cu alloy, formed by bonding at least the first metal layer and the second metal layer to each other in a thickness direction,
wherein either the first metal layer or the second metal layer of the overlay clad plate material is partially removed to form an exposure surface on which either the second metal layer or the first metal layer is exposed,
wherein the overlay clad plate material further includes a third metal layer bonded to either the second metal layer or the first metal layer to hold either the second metal layer or the first metal layer between the third metal layer and either the first metal layer or the second metal layer,
wherein the third metal layer in a region corresponding to the exposure surface is partially removed to form a reverse side exposure surface on which either the second metal layer or the first metal layer is exposed, and
wherein the overlay clad plate material further includes a reaction suppressing layer made of Ni or Ni alloy on at least one of an interface between the first metal layer and the second metal layer and an interface between the second metal layer and the third metal layer.

13. A battery comprising a battery terminal including an overlay clad plate material including at least a first metal layer made of Al or Al alloy and a second metal layer made of Cu or Cu alloy, formed by bonding at least the first metal layer and the second metal layer to each other in a thickness direction, wherein
in the battery terminal, either the first metal layer or the second metal layer of the overlay clad plate material is partially removed to form an exposure surface on which either the second metal layer or the first metal layer is exposed,
either the first metal layer or the second metal layer of the battery terminal includes a first bonding surface bonded to a connecting member configured to connect with an external portion,
either the second metal layer or the first metal layer of the battery terminal includes a second bonding surface bonded to the current collector,
the first bonding surface is formed in a region excluding the exposure surface of a first surface on a side formed with the exposure surface, and
the second bonding surface is formed in a region corresponding to the exposure surface.

14. The battery according to claim 13, further comprising:
an electrode; and
a current collector configured to connect with the electrode.

15. The battery according to claim 14, wherein
either the first metal layer or the second metal layer including the first bonding surface is made of a same type of metal material as that of the connecting member, and
either the second metal layer or the first metal layer including the second bonding surface is made of a same type of metal material as that of the current collector.

16. A method for manufacturing a battery terminal, comprising steps of:
forming an overlay clad plate material by bonding at least a first metal layer made of Al or Al alloy and a second metal layer made of Cu or Cu alloy to each other in a thickness direction; and
partially removing either the first metal layer or the second metal layer of the overlay clad plate material to form an exposure surface on which either the second metal layer or the first metal layer is partially exposed,
wherein either the first metal layer or the second metal layer includes a first bonding surface bonded to a connecting member configured to connect a battery to an external portion, and
the step of forming the exposure surface includes a step of removing either the first metal layer or the second metal layer in a region excluding a region corresponding to the first bonding surface to form the exposure surface.

17. The method for manufacturing a battery terminal according to claim 16, further comprising a step of forming a protrusion portion protruding toward either the first metal layer or the second metal layer on the overlay clad plate material after the step of forming the overlay clad plate material and before the step of forming the exposure surface, wherein
the step of forming the exposure surface includes a step of partially cutting either the first metal layer or the second metal layer in the protrusion portion to form the exposure surface on the protrusion portion.

18. The method for manufacturing a battery terminal according to claim 17, wherein
the step of forming the protrusion portion includes a step of forming the protrusion portion on the overlay clad plate material by cold forging.

19. A method for manufacturing a battery terminal, comprising steps of:
forming an overlay clad plate material by bonding at least a first metal layer made of Al or Al alloy and a second metal layer made of Cu or Cu alloy to each other in a thickness direction; and partially removing either the first metal layer or the second metal layer of the overlay clad plate material to form an exposure surface on which either the second metal layer or the first metal layer is partially exposed, wherein the step of forming the exposure surface includes a step of removing either the first metal layer or the second metal layer and partially removing either the second metal layer or the first metal layer to form the exposure surface in a concave shape concave toward either the second metal layer or the first metal layer beyond an interface between the first metal layer and the second metal layer.

\* \* \* \* \*